US008700363B2

(12) United States Patent
Heinzerling

(10) Patent No.: US 8,700,363 B2
(45) Date of Patent: Apr. 15, 2014

(54) ETOPS IFSD RISK CALCULATOR

(75) Inventor: Daryl W. Heinzerling, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 231 days.

(21) Appl. No.: 12/877,951

(22) Filed: Sep. 8, 2010

(65) Prior Publication Data

US 2012/0059631 A1 Mar. 8, 2012

(51) Int. Cl.
*G06F 17/18* (2006.01)
*G01C 21/20* (2006.01)

(52) U.S. Cl.
CPC ............... *G06F 17/18* (2013.01); *G01C 21/20* (2013.01)
USPC ...................... 703/2; 701/3; 701/14; 701/528

(58) Field of Classification Search
CPC ............................... G06F 17/18; G01C 21/20
USPC ..................... 703/2; 701/3, 14, 528
See application file for complete search history.

(56) References Cited

U.S. PATENT DOCUMENTS

| 5,586,252 | A * | 12/1996 | Barnard et al. .................. 714/48 |
| 6,631,384 | B1 * | 10/2003 | Richman et al. ...................... 1/1 |
| 2005/0021212 | A1 * | 1/2005 | Gayme et al. .................... 701/99 |
| 2007/0150124 | A1 * | 6/2007 | Wipplinger et al. .............. 701/3 |
| 2008/0312783 | A1 * | 12/2008 | Mansouri et al. ............... 701/29 |

FOREIGN PATENT DOCUMENTS

EP  1 243 895 A2  9/2002

OTHER PUBLICATIONS

Code of Federal Regulations, Title 14, sections 91.153, 121.374 (2010).*
FAA Advisory Circular 25.1309-1A "System Design and Analysis" (1988).*
Easton, Valerie J.; McColl, John H. "Statistics Glossary" (2008) available at <http://www.stats.gla.ac.uk/steps/glossary/probability.html>.*

(Continued)

*Primary Examiner* — Kandasamy Thangavelu
*Assistant Examiner* — Jay B Hann
(74) *Attorney, Agent, or Firm* — Smith Moore Leaterwood LLP

(57) ABSTRACT

A system and method for analyzing a risk of extended operations (ETOPS) dual independent engine in-flight shutdown (IFSD) using an ETOPS IFSD risk calculation means is disclosed. A two-engine aircraft/engine combination performance data set is provided to obtain flight specific data, and a user input variable array is also provided. Flight times are calculated based on the flight specific data and the user input variable array. Dual independent engine shutdown total thrust loss probability values for various phases of an ETOPS flight are calculated based on the user input variable array, the flight specific data, and the flight times. A calculated risk of dual independent engine in-flight shutdown on the ETOPS flight is calculated based on a sum of the dual independent engine shutdown total thrust loss probability values.

18 Claims, 8 Drawing Sheets

(56) References Cited

OTHER PUBLICATIONS

Simpson, Robert & Ausrotas, Raymond "A Review of Extended-Range Operations by Transport Aircraft" Flight Transportation Laboratory (FTL) Report R87-9 (1987).*

FAA Advisory Circular 39-8 Continued Airworthiness Assessments of Powerplant and Auxiliary Power Unit Installations of Transport Category Airplanes; Sep. 8, 2003; p. A1-1 Section 2a, p. A1-4 Sections 3d(1) and 3d(2), and p. A5-2 Section 2f.

FAA Advisory Circular 39-8 Continued Airworthiness Assessments of Powerplant and Auxiliary Power Unit Installations of Transport Category Airplanes; Sep. 8, 2003.

European Search Report dated Nov. 12, 2013 for European Application No. 11 180 579.2, 7 pages.

"Extended Range Operation with Two-Engine Aeroplanes ETOPS Certification and Operation," European Aviation Safety Agency Ed Decision No. 2003/12/RM on General Acceptable Means of Compliance for Airworthiness of Products, Parts and Appliances, AMC 20, Part AMC 20-6, XP-002714522, Nov. 5, 2003, retrieved on Oct. 8, 2013 from http://www.easa.europa.eu/agency-measures/docs/agency-decisions/2010/2010-012-R/Annex%2011%20-%20AMC%2020-6.pdf, 66 pages.

* cited by examiner

| | | Current Value (Time in hours) | Range (Time in hours) Min. | Range (Time in hours) Max. | Optional Default Values (Time in hours) |
|---|---|---|---|---|---|
| Planned Total Flight Time | $T_T$ | 9.1 | 2.0 | 20.0 | 3.0 |
| ETOPS Rules Time | $T_R$ | 3.0 | 1.0 | 8.0 | 1.0 |
| ETOPS Threshold Time | $T_E$ | 1.0 | 1.0 | 3.0 | 0.333 |
| Average duration of the Climb phase. | $T_1$ | 0.333 | 0.200 | 1.000 | |
| Projected time to land following an engine shutdown while in Climb phase. | $T_{A1}$ | 0.7 | 0.1 | 1.0 | 0.7 |
| Normal time duration of the Non-ETOPS Early Cruise phase. | $T_2$ | 2.0 | 0.667 | 7.1 | 2.0 |
| Projected single-engine time to land while in the Non-ETOPS Early Cruise phase. | $T_{A2}$ | 0.775 | 0.250 | 1.000 | |
| Normal time duration of the ETOPS phase. | $T_3$ | 4.350 | 0.0 | 7.1 | |
| Projected single-engine time to land while in ETOPS phase. | $T_{A3}$ | 2.088 | 0.417 | 3.0 | TA3 is the lesser of: 2.088  2.200 |
| Normal time duration of the Non-ETOPS Late Cruise phase. | $T_4$ | 2.0 | 0.583 | 7.1 | 2.0 |
| Projected single-engine time to land while in Non-ETOPS Late Cruise phase. | $T_{A4}$ | 0.709 | 0.417 | 1.0 | |
| Average duration of the two-engine Descent phase. | $T_5$ | 0.417 | 0.417 | 0.417 | 0.417 |
| Projected single-engine time to land while in Descent phase. | $T_{A5}$ | 0.2085 | 0 | 0.417 | |

| | | | | | |
|---|---|---|---|---|---|
| Climb-Phase Engine Shutdown Rate | $r_1$ | 2.9E-05 | 7.40 | Climb ratio | These 3 factors times the total IFSD Rate $K_F$ = the period engine shutdown rates $r_1$, $r_2$ and $r_3$ based on recent experience |
| Cruise-Phase Engine Shutdown Rate | $r_2$ | 1.76E-06 | 0.44 | Cruise ratio | |
| Descent-Phase Engine Shutdown Rate | $r_3$ | 6.40E-06 | 1.60 | Descent ratio | |
| Single-Engine-Cruise Shutdown-Stress Factor (default=2) | $K_1$ | 2 | | | 2 |
| Ratio of hard climb IFSD rate to total climb IFSD rate (default=0.87) | $K_{NI}$ | 0.870 | | | 0.87 |
| Ratio of hard cruise IFSD rate to total cruise IFSD rate (default=0.78) | $K_N$ | 0.780 | | | 0.78 |
| Ratio of hard descent IFSD rate to total descent IFSD rate (default=1) | $K_{ND}$ | 1.000 | | | 1.00 |
| Ratio of single-engine descent time to two-engine descent time | $K_S$ | 0.6 | | | |
| User setable IFSD rate | $K_F$ | 0.004 | | | 0.004 |

| | | |
|---|---|---|
| Probability of Total Thrust Loss from dual independent engine shutdowns starting during the Climb Phase | $P_1$ | 4.86E-11 |
| Probability of Total Thrust Loss from dual independent engine shutdowns starting during the Non-ETOPS Early Cruise Phase | $P_2$ | 1.48E-11 |
| Probability of Total Thrust Loss from dual independent engine shutdowns starting during the ETOPS Phase | $P_3$ | 7.94E-11 |
| Probability of Total Thrust Loss from dual independent engine shutdowns starting during the Non-ETOPS Late Cruise Phase | $P_4$ | 1.57E-11 |
| Probability of Total Thrust Loss from dual independent engine shutdowns starting during the Descent Phase | $P_5$ | 7.12E-12 |
| Probability of Total Thrust Loss from dual independent engine shutdowns at any time during the entire flight | $P_T$ | 1.66E-10 |
| Per-Flight-Hour Probability of Total Thrust Loss from dual independent engine shutdowns averaged over the entire flight | $P_A$ | 1.82E-11 |
| Per-Flight-Hour Probability of Total Thrust Loss from dual independent engine shutdowns averaged over the ETOPS phase of flight | $P_E$ | 1.82E-11 |

| Elasped Hours | Cum Risk |
|---|---|
| 0 | 0 |
| 0.333 | 4.86E-11 |
| 2.333 | 6.34E-11 |
| 6.683 | 1.43E-10 |
| 8.683 | 1.58E-10 |
| 9.1 | 1.66E-10 |

FIG. 7

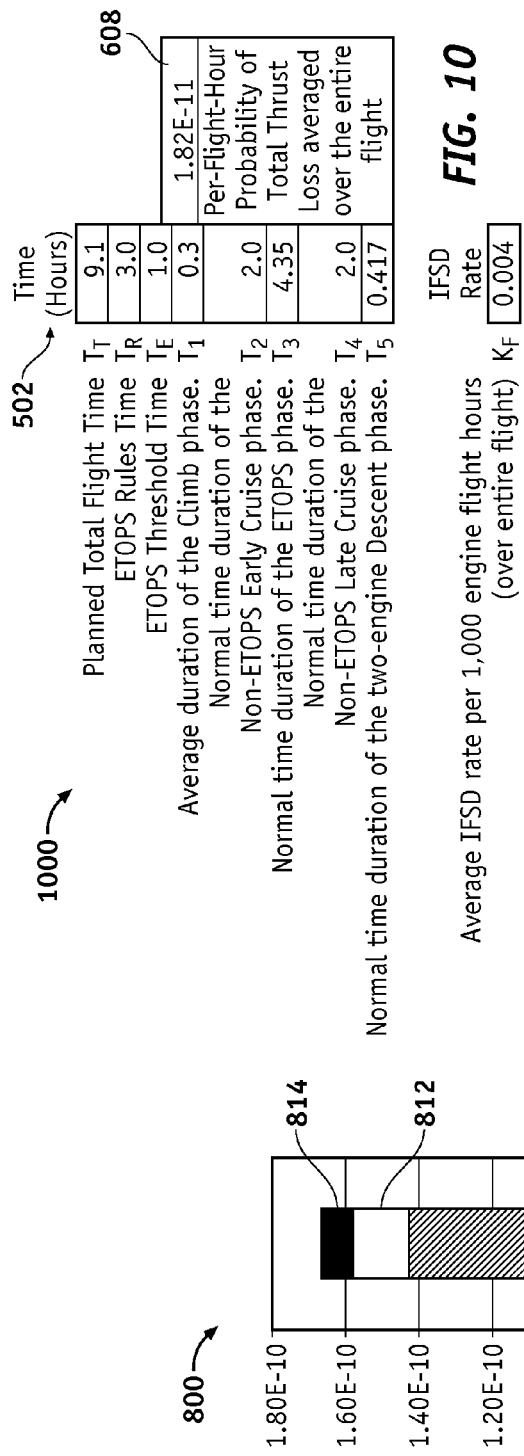
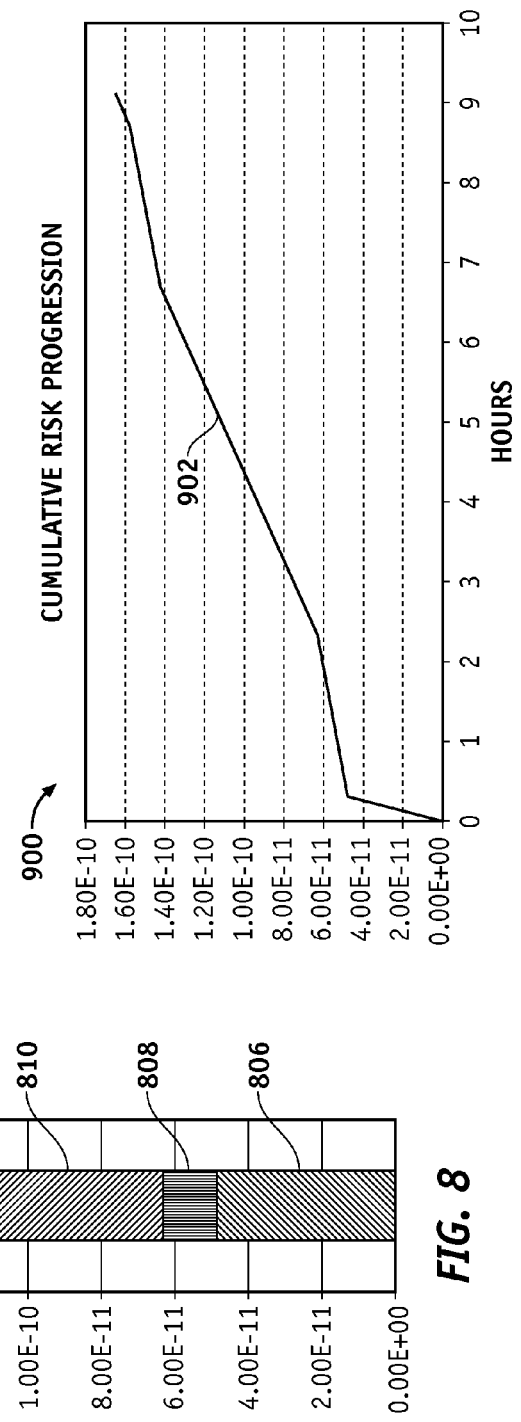
FIG. 8
FIG. 9
FIG. 10

ETOPS IFSD RISK CALCULATOR

FIELD

Embodiments of the present disclosure relate generally to aircraft operations. More particularly, embodiments of the present disclosure relate to determining aircraft operations.

BACKGROUND

The International Civil Aviation Organization (ICAO) Standards and Recommended Practices (SARPs) set rules for twin-engine commercial air travel. The rules permit twin-engine commercial air travel on flying routes that extend beyond a distance of 60 minutes of flying time at one-engine inoperative speed from a nearest airport if the aircraft and operator are approved for such operations. These operations are referred to as Extended Operations (ETOPS).

Regulations for ETOPS are based on risk estimation. Aircraft operators may be allowed more freedom when their estimated risk is lower. If risk can be more accurately estimated and lowered, aircraft operators may be able to fly more directly and to more locations. If regulators learn the drivers of risk, they may be less likely to restrict operations due to substantially inconsequential risks. Currently, many regulators around the world are unnecessarily restricting aircraft operations based on non-optimal beliefs of risk drivers and risk levels of current operations. The focus of regulations and restrictions is often incorrectly placed on a risk of dual independent engine in-flight shutdowns on two-engine aircraft.

SUMMARY

A system and method for analyzing a risk of extended operations (ETOPS) dual independent engine in-flight shutdown (IFSD) using ETOPS IFSD risk calculation means is disclosed. Input parameters such as a two-engine aircraft/engine combination performance data set, and a user input variable array are provided. Output parameters such as thrust loss probability values and flight times for various phases of an ETOPS flight are calculated. The risk is calculated using ETOPS IFSD risk calculation means based on the input and the output parameters. The ETOPS IFSD risk calculation means demonstrates that an estimated risk of dual independent engine in-flight shutdowns on two-engine is lower than a conventional risk estimate that conventional analysis and equations generally indicate, and lower than other known risks. In this manner, the ETOPS IFSD risk calculator means encourages and enables regulators to allow longer ETOPS rule times and thus shorter flights, reduced fuel consumption, and higher payload range, for two-engine ETOPS operations.

In a first embodiment, a method analyzes a risk of extended operations (ETOPS) dual independent engine in-flight shutdown (IFSD) using ETOPS IFSD risk calculation means. The method provides a two-engine aircraft/engine combination performance data set, to obtain flight specific data, and a user input variable array. The method calculates flight times based on the user input variable array and the flight specific data. The method also calculates dual independent engine shutdown total thrust loss probability values for various phases of an ETOPS flight based on the user input variable array, the flight specific data, and the flight times. The method calculates a calculated risk of dual independent engine in-flight shutdown on the ETOPS flight based on a sum of the dual independent engine total thrust loss probability values.

In a second embodiment, an extended operations (ETOPS) dual independent engine in-flight shutdown (IFSD) risk analysis system comprises a memory module operable to store a performance data set of a two-engine aircraft/engine combination to obtain flight specific data. The system further comprises an input module operable to receive a user input variable array. The user input variable array comprises parameters for a specific two-engine aircraft/engine combination on an ETOPS flight, and average engine in-flight shutdown rates. The system also comprises an ETOPS IFSD risk calculator module operable to calculate flight times based on the user input variable array, and the flight specific data. The ETOPS IFSD risk calculator module further calculates probability values based on the user input variable array, the flight specific data, and the flight times. The ETOPS IFSD risk calculator module further calculates a risk of a dual independent engine shutdown total thrust loss starting at any time during the ETOPS flight based on the probability values. The system also comprises a display module operable to display the user input variable array, the probability values, and the risk on a display screen.

In a third embodiment, a computer readable medium comprises program code for analyzing a risk of extended operations (ETOPS) dual independent engine in-flight shutdown (IFSD) using ETOPS IFSD risk calculation means. The program code provides a two-engine aircraft/engine combination performance data set to obtain flight specific data, and a user input variable array. The program code further calculates flight times based on the user input variable array and the flight specific data. The program code further calculates dual independent engine shutdown total thrust loss probability values for various phases of an ETOPS flight based on the user input variable array, the flight specific data, and the flight times. The program code further calculates a probability of total thrust loss starting at any time during the ETOPS flight to obtain a calculated risk of the dual independent engine in-flight shutdown on the ETOPS flight based on the dual independent engine shutdown total thrust loss probability values.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

FIG. 5 is an illustration of an exemplary input parameter table of an ETOPS IFSD risk calculator module according to an embodiment of the disclosure.

FIG. 6 is an illustration of an exemplary output parameter table of an ETOPS IFSD risk calculator module according to an embodiment of the disclosure.

FIG. 7 is an illustration of an exemplary output parameter table of an ETOPS IFSD risk calculator module presented on a display according to an embodiment of the disclosure.

FIG. 8 is an illustration of exemplary graphical output of summed risks shown in the output parameter table of FIG. 7, presented on a display using a bar chart graph according to an embodiment of the disclosure.

FIG. 9 is an illustration of an exemplary graphical output of the cumulative risk progression of all phases of an ETOPS flight shown in the output parameter table of FIG. 7, presented on a display using a linear graph according to an embodiment of the disclosure.

FIG. 10 is an illustration of an exemplary input parameter table presented on a display according to an embodiment of the disclosure.

DETAILED DESCRIPTION

Figure 1:
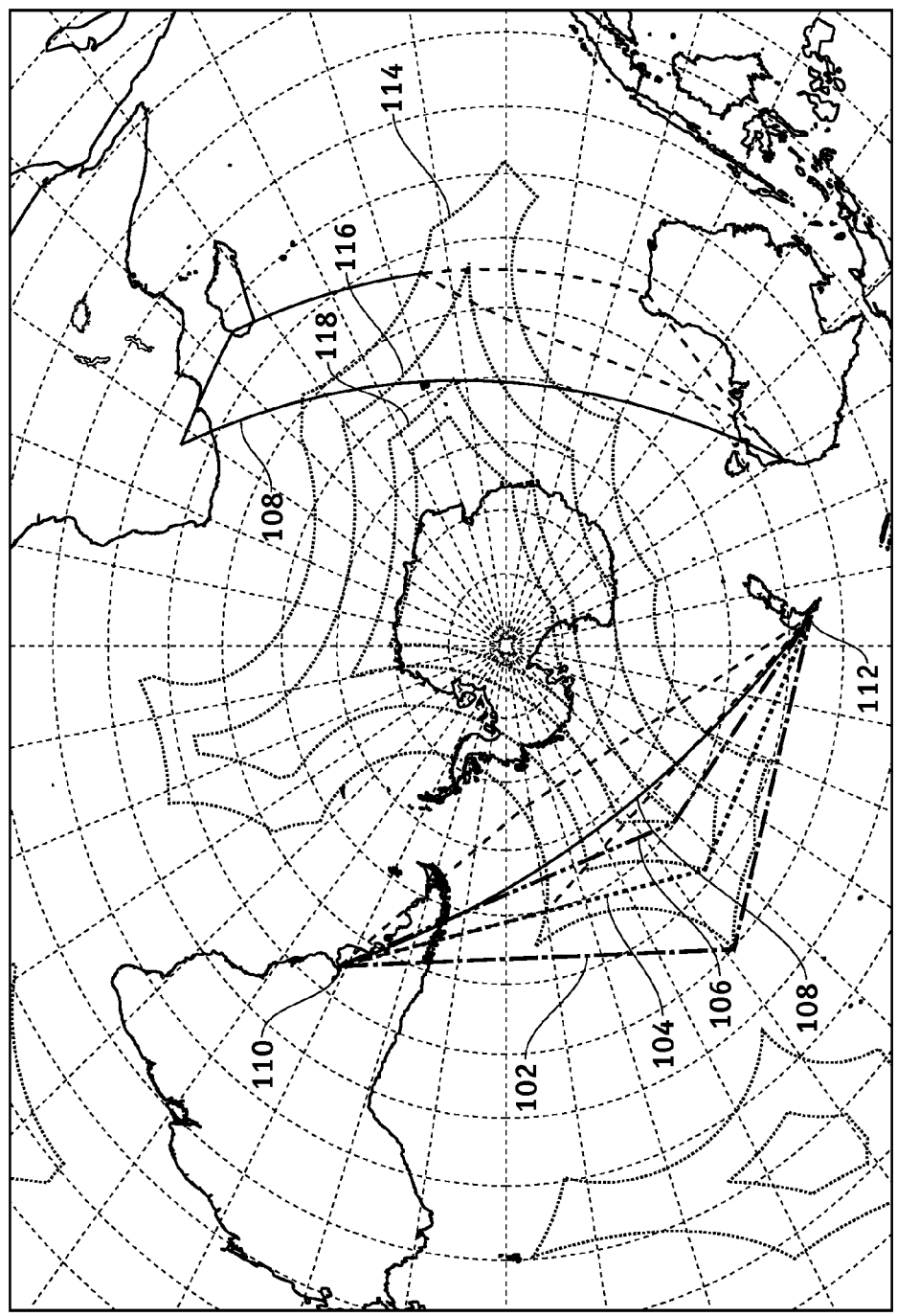
FIG. 1 is an illustration of an ETOPS route between Buenos Aires and Auckland with three different ETOPS rule times.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aircraft operations, and other functional aspects of the systems (and the individual operating components of the systems) may not be described in detail herein. In addition, those skilled in the art will appreciate that embodiments of the present disclosure may be practiced in conjunction with a variety of two-engine aircraft types, and that the embodiments described herein are merely example embodiments of the disclosure.

Embodiments of the disclosure are described herein in the context of a practical non-limiting application, namely, twin-engine ETOPS aircraft operations. Embodiments of the disclosure, however, are not limited to such twin-engine ETOPS applications, and the techniques described herein may also be utilized in other aircraft operations applications. For example, embodiments may be applicable to single engine flight operations, three engine flight operations, four engine flight operations, and the like.

As would be apparent to one of ordinary skill in the art after reading this description, the following are examples and embodiments of the disclosure and are not limited to operating in accordance with these examples. Other embodiments may be utilized and changes may be made without departing from the scope of the exemplary embodiments of the present disclosure.

There are currently approximately a dozen existing equations used by current regulations for calculating a risk of "dual independent engine shutdown on two-engine aircraft". Most of the existing equations are not quoted directly in the regulations because it is understood that they may only roughly approximate the risk. Most of the current equations for calculating a risk on an ETOPS flight generally have similar shortfalls. The current equations generally treat an ETOPS flight as a whole and try to average the risk over the whole flight. To do this, the current equations make assumptions and generalizations, usually leaning toward conservative choices. A summed risk of the conservative choices may overwhelm an actual risk, and the summed risk may portray a risk that is substantially higher than an actual risk. Another problem with use of the current equations is lack of versatility and visibility. There is substantially no way to adjust the current equations based on varying operations or assumptions, or to examine how estimated risk builds as a flight progresses. The current equations are, but are available from the ICAO.

Figure 2:
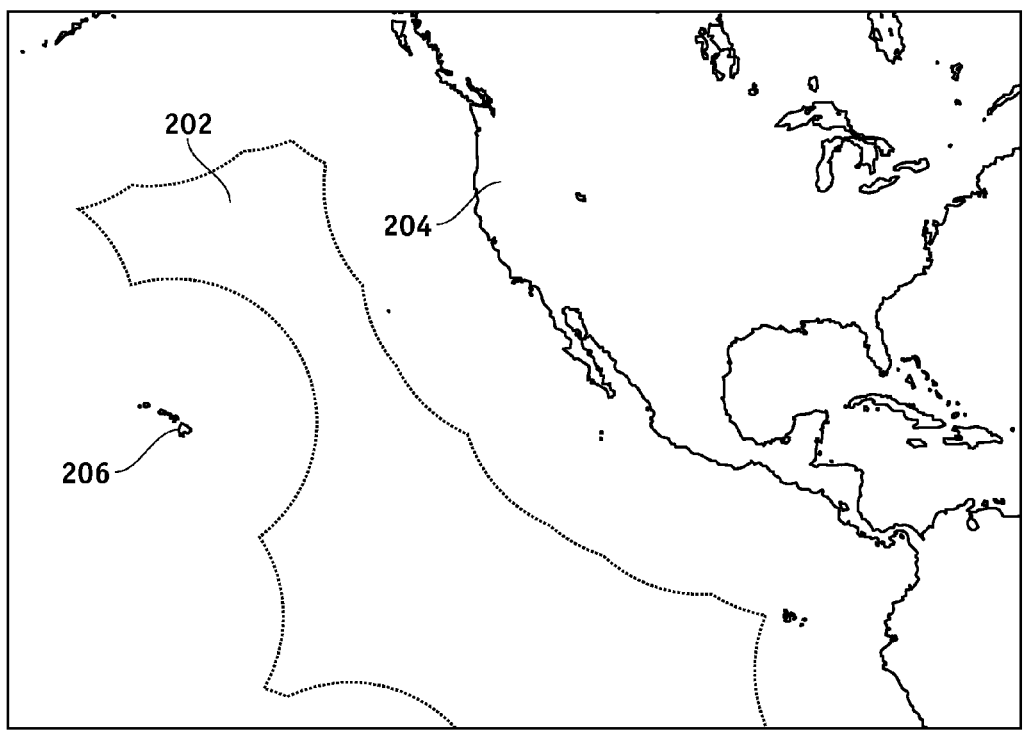
FIG. 2 is an illustration of a map showing that flights between the contiguous United States and Hawaii are not practical using 120-minute ETOPS rules.

ETOPS flights in the year 2010 were restricted to 180-minutes. However, longer ETOPS times such as 240-minutes and 300-minutes, afforded by lower risk equate to shorter flights as shown in more detail below. FIG. 1 is an illustration of three ETOPS flight paths with varying ETOPS approval levels. FIG. 2 shows that longer ETOPS times also make some routes possible. Aviation regulators may be more likely to grant more and longer ETOPS approvals when the risk of dual independent engine shutdown is shown to be within tolerable limits according to embodiments of the disclosure.

FIG. 1 is an illustration of a map of a long-range operation in the southern hemisphere of the Earth showing three ETOPS flight paths 102, 104, and 106 with varying ETOPS approval levels between Buenos Aires 110 and Auckland 112. The flight paths 102, 104, and 106 are based on three different ETOPS rule times respectively. As mentioned above, ETOPS flights in the year 2010 were restricted to 180-minutes as shown by the flight path 102. The flight path 102 uses the current, popular 180-minute 114 ETOPS rule, and is required to fly a long path far from an optimal great circle 108. However, longer ETOPS times of 240-minutes 116 and 300-minutes 118, afforded by lower risk equate to shorter flights such as the flight path 104 and the flight path 106 respectively. Thus, the flight path 104 is shorter, using the 240-minute 116 ETOPS rule and the flight path 106 is nearly optimal, using the 300-minute 118 ETOPS rule. By demonstrating sufficiently low risk, an ETOPS IFSD risk calculator according to embodiments of the disclosure enables regulators to allow operators to use longer ETOPS rule times. Longer ETOPS rule times mean shorter flights that equate to lower fuel consumption, lower pollution, and higher payload range.

FIG. 2 shows that flights between the contiguous United States 204 and Hawaii 206 are not practical using 120-minute ETOPS rules. Area 202 represents the region that is further than 120-minutes from the nearest airport, and thus out-of-bounds for a 120-minute ETOPS flight. However, with the 180-minute ETOPS, the area 202 is no longer applicative and flights from Hawaii 206 are allowed direct paths to and from the contiguous United States 204. Thus, longer ETOPS times also make some ETOPS routes possible. Aviation regulators may be more likely to grant more and longer ETOPS flight approvals when the risk of dual independent engine shutdown is shown to be within tolerable limits according to embodiments of the disclosure.

Figure 3:
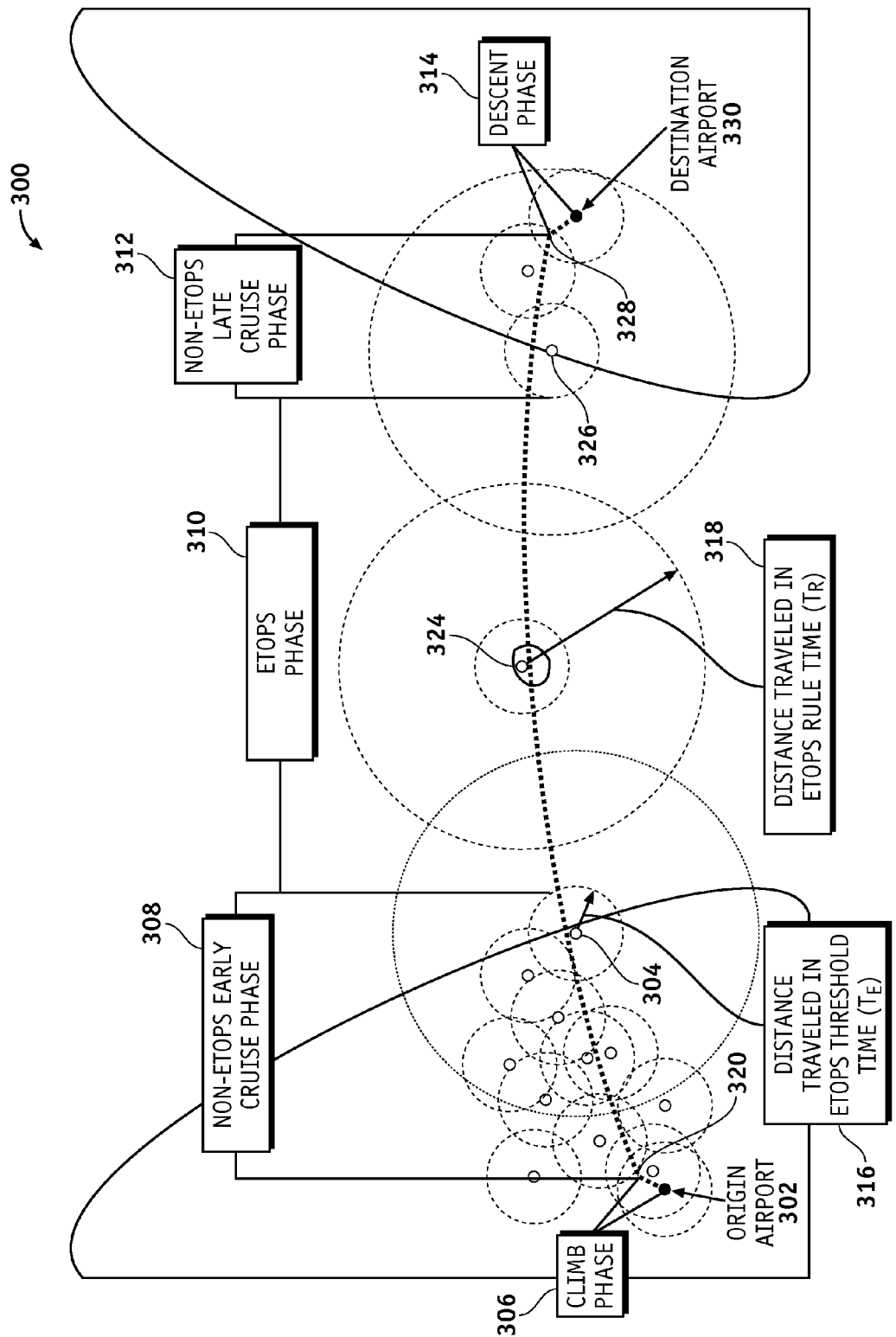
FIG. 3 is an illustration of phases of an ETOPS flight.

FIG. 3 is an illustration of phases of an ETOPS flight. FIG. 3 shows five phases of an ETOPS flight starting from an origin airport 302 and ending at a destination airport 330 (ETOPS route). The phases of the ETOPS flight comprises a climb phase 306, a Non-ETOPS early cruise phase 308, an ETOPS phase 310, a Non-ETOPS late cruise phase 312, and a descent phase 314.

The climb phase 306 is a portion of an ETOPS flight from liftoff until a start of the Non-ETOPS early cruise phase 308. During the climb phase 306, the aircraft engines may operate at a high power level in order to increase an altitude to a cruise level. Engine operation during high power level may have a higher shutdown rate than engine operation during a relatively lower power level of normal cruise operation. Climb engine shutdown rates are also higher than cruise engine shutdown rates for other reasons, for example but without limitation, an initial operation after engine maintenance reveals a non-optimal maintenance state, and an operation in variable atmospheric conditions at varying altitudes may subject engines to additional stresses, and the like.

The Non-ETOPS early cruise phase 308 is a portion of an ETOPS flight from an end of the climb phase 306 until the ETOPS flight is an ETOPS threshold time $T_E$ 316 from the nearest suitable airport at one-engine inoperative cruise speed, which for twins is usually one hour (60-minutes) from the nearest airport 304 (FIG. 2). The Non-ETOPS early cruise phase 308 can include climbs and descents, and may not exist (zero time duration) on a particular flight. The zero time duration for the Non-ETOPS early cruise phase 308 occurs when the ETOPS flight is still in climb when the ETOPS flight reaches $T_E$ 316 from the nearest (suitable) airport 304 at one-engine inoperative cruise speed. Notably, the nearest suitable airport at this point may still be the origin airport 302.

The ETOPS phase 310 is a portion of an ETOPS flight that starts at a first moment when the ETOPS flight is at $T_E$ 316 from the nearest airport at one-engine inoperative cruise speed and ends at a last moment when the ETOPS flight is at $T_E$ 316 from the nearest suitable airport at one-engine inoperative cruise speed. The ETOPS phase 310 can comprise climbs and descents and may fly directly over a suitable alternate airport 324, provided that there are portions of the flight both before and after that are greater than $T_E$ 316 from the nearest suitable airport.

The Non-ETOPS late cruise phase 312 is a portion of a normal ETOPS flight from a last point in an ETOPS flight at more than $T_E$ 316 from the nearest suitable airport 326 (FIG. 2) at one-engine inoperative cruise speed, until a start of the descent to land phase of flight. This phase may comprise climbs and descents, and may not exist (zero time duration) on a particular flight. The zero time duration for the Non-ETOPS late cruise phase 312 occurs when the flight starts descent to land while further than $T_E$ 316 from the nearest suitable (destination) airport 326 or 330 at one-engine inoperative cruise speed.

The descent phase 314 is a portion of an ETOPS flight from an end of the last cruise phase 312 until a landing at the destination airport 330.

An ETOPS IFSD risk calculator is used to calculate risk of a dual independent engine shutdown sequence for various ETOPS routes as explained in more detail below. The ETOPS IFSD risk calculator can be used to provide evidence of satisfactory performance in single engine out conditions as may be needed for performance certification by various civil aviation authorities, such as but without limitation: the United States Federal Aviation Administration (FAA), European Aviation Safety Agency (EASA), Joint Aviation Authorities (JAA), European Civil Aviation Conference (ECAC), European Organisation for the Safety of Air Navigation (Eurocontrol), Japan Civil Aviation Bureau (JCAB), General Administration of Civil Aviation of China (CAAC), International Civil Aviation Organization (ICAO), and the like.

In addition to aircraft route analysis, embodiments of the ETOPS IFSD risk calculator can be useful for other type of vehicles and applications that endure long distance operations using one or more propulsion units, systems, and/or engines. Other type of vehicles and applications may comprise, for example but without limitation, various types of manned aircraft, unmanned aircraft, military missions, spacecraft, maritime craft, limited under-water range submarines, ground vehicles, and the like. Embodiments of the ETOPS IFSD risk calculator described herein can also be used for analyzing capabilities of legacy aircraft, and new, prospective and contemplative aircraft designs.

Figure 4:
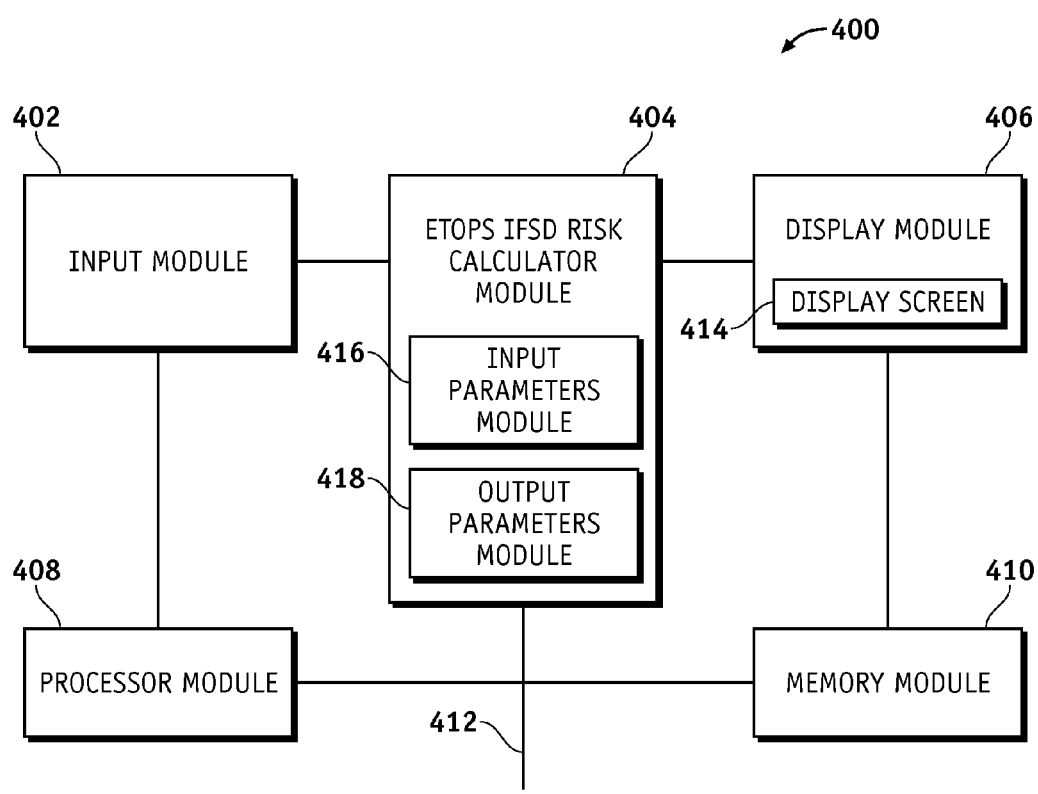
FIG. 4 is an illustration of a schematic functional block diagram of an ETOPS dual independent engine IFSD risk analyzer system according to an embodiment of the disclosure.

FIG. 4 is an illustration of a schematic functional block diagram of an extended operations (ETOPS) dual independent engine in-flight shutdown (IFSD) risk analysis system 400 (system 400) according to an embodiment of the disclosure. The system 400 may represent, for example but without limitation, a desktop, a laptop or notebook computer, a handheld computing device (PDA, cell phone, palmtop, etc.), a mainframe, a server, a client, or any other type of special or general purpose computing device as may be desirable or appropriate for a given application or environment. For example but without limitation, the system 400 may be, part of an aircraft computer, a dedicated system on-board an aircraft, a part of a ground support computer, a dedicated ground system, and the like. The system 400 generally comprises a physical housing (not shown), an input module 402, an ETOPS IFSD risk calculator module 404, a display module 406, a processor module 408, and a memory module 410.

A practical system 400 may comprise any number of input modules, any number of processor modules, any number of memory modules, and any number of display modules. The illustrated system 400 depicts a simple embodiment for ease of description. These and other elements of the system 400 are interconnected together, allowing communication between the various elements of system 400. In one embodiment, these and other elements of the system 400 may be interconnected together via a communication link 412. Those of skill in the art will understand that the various illustrative blocks, modules, circuits, and processing logic described in connection with the embodiments disclosed herein may be implemented in hardware, computer-readable software, firmware, or any practical combination thereof. To illustrate clearly this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The input module 402 receives input parameters (FIG. 5) from a user and sends the input parameters to the ETOPS IFSD risk calculator module 404. The input module 402 may comprise input means, for example but without limitation, activation keys, touch pads keys, locally or remotely accessed databases, and the like.

The ETOPS IFSD risk calculator module 404 calculates risks associated with a dual independent engine shutdown sequence for various ETOPS routes comprising the five phases of the ETOPS flight (FIG. 3). The ETOPS IFSD risk calculator module 404 calculates risk based on an event-sequence analysis probabilistic model. In this manner, the ETOPS IFSD risk calculator module 404 calculates risks for each of the five phases of flight separately, and then sums each of the risks to obtain the risk for the total flight. For each flight phase, the ETOPS IFSD risk calculator module 404 determines a probability that a first engine shutdown will be followed by a second engine shutdown (unrestartable) before the aircraft can land, and that the first engine shutdown will not be restartable. Because an event sequence in each phase is mutually exclusive of the other phases of the five phases of flight, a probability of the event sequence happening in a whole of an ETOPS flight is a sum of probabilities in the five phases of flight. In this manner, the ETOPS IFSD risk calculator module 404 calculates a risk that is lower than a conventional risk estimate that conventional analysis and conventional equations generally indicate, and lower than other known risks. The lower risk enables the regulators to allow longer ETOPS rule times and thus shorter flights, reduced fuel consumption, and higher payload range for two-engine ETOPS operations.

The ETOPS IFSD risk calculator module 404 receives a performance data set of a two-engine aircraft/engine combination and uses the performance data, along with specific data entered by the user to calculate the risk of the "dual independent engine shutdown sequence" as explained in more detail below.

For example, parameters relevant to experience on a specific aircraft model may be entered in to the input parameter module 416 via the input module 402 to more accurately portray an actual risk. The user can easily change any input parameter (FIG. 5) and substantially immediately calculate output parameters (FIGS. 6-7) via the output parameters module 418 to observe how risk is affected on any phase (FIG. 3) of the flight, or the flight as a whole. The output from the output parameters module 418 is graphically and/or numerically automatically displayed (FIGS. 8-10) on the display screen 414 for easy understanding as explained in more detail below.

In this manner, effects of small changes on parameters that substantially affect risk can be evaluated according to embodiments of the disclosure. In contrast, current equations for risk may generally be overly conservative due to inflexibility and inability to accommodate most parameters, and cumbersome to use.

In one embodiment, the ETOPS IFSD risk calculator module 404 may perform risk calculation in real-time using in-flight performance parameters for one or more input parameters (FIG. 5). The ETOPS IFSD risk calculator module 404 may be used, for example but without limitation, in an aircraft/in-flight computer, in a ground support computer, in a computer at regulatory agencies, and the like, and may be used when a change in aircraft systems occurs during in-flight operations. For example, pilots can perform the calculations in real-time using the ETOPS IFSD risk calculator module 404. Ground operators can also perform the same calculations to confirm and verify the calculations performed by the pilot. The in-flight computer and the ground support computer can communicate with each other to compare and verify results of the calculations. In this manner, pilots, ground operators, and ground authorities can determine whether to land the aircraft to avail themselves of service opportunities that can ensure satisfactory aircraft performance.

The display module 406 is configured to display input and output parameters of the system 400. The display module 406 displays an image based on input parameters (FIG. 5) and output parameters (FIGS. 6-7) of the ETOPS IFSD risk calculator module 404. The display module 406 may accept a user input operation to input and transmit data, and input operation commands for functions provided in the system 400. The display module 406 accepts the operation command, and outputs operation command information to the processor module 408 in response to the accepted operation command. The display module may comprise a display screen 414 formed by, for example but without limitation, an organic electro-luminescence (OEL) panel, liquid crystal panel (LCD), and the like. Various kinds of information can be displayed on the display screen 414 of the display module 406 via an image/video signal supplied from the processor module 408. For example, input/output parameters of the ETOPS IFSD risk calculator module 404 can be displayed graphically (FIGS. 8-9) and numerically (FIG. 10) on the display screen 414 as explained in more detail below in the context of discussion of FIGS. 8-10.

The processor module 408 is configured to support functions of the ETOPS IFSD risk calculator module 404. For example, the processor module 408 may control operations of the system 400 so that processes of the system 400 are suitably performed. These processes may comprise, for example but without limitation, control of input/output parameters data signals to/from the ETOPS IFSD risk calculator module 404, performing calculation of landing times and probability values of total thrust loss for various phases of the ETOPS flight based on various equations as explained below, control of the display module 406 to display input/output parameters, and the like. In this manner, the processor module 408 uses the ETOPS IFSD risk calculator 404 to calculate a more accurate and lower risk than a conventional risk estimate, allowing shorter flights, reduced fuel consumption, higher payload range, and lower flight times for two-engine ETOPS operations in a fast and efficient manner as explained in more detail below.

The processor module 408 also accesses the memory module 410 such as access to the input parameters such as the two-engine aircraft/engine combination performance data set, the user input variable array, and the flight times. The processor module 408, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, the processor module 408 comprises processing logic that is configured to carry out the functions, techniques, and processing tasks associated with the operation of system 400. In particular, the processing logic is configured to support risk calculation of the ETOPS IFSD risk calculator module 404 described herein.

The memory module 410 may be any suitable data storage area with suitable amount of memory that is formatted to support the operation of the system 400. The memory module 410 is configured to store, maintain, and provide data as needed to support the functionality of the system 400 in the manner described below. In practical embodiments, the memory module 410 may comprise, for example but without limitation, a non-volatile storage device (non-volatile semiconductor memory, hard disk device, optical disk device, and the like), a random access storage device (for example, SRAM, DRAM), or any other form of storage medium known in the art. The memory module 410 may be coupled to the processor module 408 and configured to store, for example but without limitation, the input parameter values and the output parameter values corresponding to the a risk assessment scenario.

The memory module 410 may store, for example but without limitation, input from a user to the ETOPS IFSD risk calculator module 404 such as the user input variable array, output from the ETOPS IFSD risk calculator module 404 such as the probability values, and the like, as explained in more detail below in the context of discussion of FIGS. 5-7. Additionally, the memory module 410 may represent a dynamically updating database containing a table for the purpose of using the ETOPS IFSD risk calculator module 404. The memory module 410 may also store, a computer program that is executed by the processor module 408, an operating system, an application program, tentative data used in executing a program processing, and the like. The memory module 410 may be coupled to the processor module 408 such that the processor module 408 can read information from and write information to the memory module 410. As an example, the processor module 408 and memory module 410 may reside in their respective ASICs. The memory module 410 may also be integrated into the processor module 408. In an embodiment, the memory module 410 may comprise a cache memory for storing temporary variables or other intermediate information during execution of instructions to be executed by the processor module 408.

FIG. 5 is an illustration of an exemplary input parameter table 500 of the ETOPS IFSD risk calculator module 404 according to an embodiment of the disclosure. The input parameter table 500 comprises a current value column 502, a range column 504, and an optional default values column 506. In the embodiment shown in FIG. 5, the input parameter table 500 comprises input data comprising, for example but without limitation, a predetermined two-engine aircraft/engine combination performance data set (flight specific data), the user input parameters such as parameters for the specific two-engine aircraft/engine combination on an ETOPS flight (aircraft model specific parameters), average engine in-flight shutdown rates for various flight phases, flight times calculated by the ETOPS IFSD risk calculator module 404 for various flight phases (calculated flight times), and the like. The current value column 502 shows input data values that the ETOPS IFSD risk calculator module 404 is currently using to calculate the risks. The current value column 502 comprises predetermined default values of the input data. The user may modify the data in the current value column 502 with any values within the ranges shown in the range column 504. In one embodiment, the user can manually enter input parameters associated with a specific aircraft model. Alternatively, the input parameters for each aircraft model may be input automatically. In this manner, the input parameters for each aircraft model may be input a priori and accessed by the system 400 in response to a user selection of the aircraft model for example.

The parameters for a specific two-engine aircraft/engine model on an ETOPS flight (aircraft model specific parameters) are established by experience, and may comprise, for example but without limitation: a ratio of hard climb IFSD rate to total climb IFSD rate ($K_{NT}$), a ratio of hard cruise IFSD rate to total cruise IFSD rate ($K_N$), a ratio of hard descent IFSD rate to total descent IFSD rate ($K_{ND}$), a ratio of single-engine descent time to two-engine descent time ($K_S$), and the like.

An effect of $K_N$ (calculated separately by the ETOPS IFSD risk calculator module 404) is to lower the IFSD rate of the one remaining engine after an IFSD. However, the default value of $K_1$ in the calculation doubles the normal cruise IFSD rate for this second IFSD, making the calculation very conservative.

A hard IFSD is one that cannot be safely restarted and operated up to maximum continuous thrust for an extended period of time. The hard IFSD is identical to a non-restartable IFSD. Some IFSDs (i.e., those that are not-hard IFSDs) are due to false indications or misperceptions—the engines are actually fully capable of continuing running (e.g., a false indication of a clogged oil filter, or a false indication of a fire). The ETOPS IFSD risk calculator module 404 uses the total cruise IFSD rate (i.e., $r_2$ comprising both hard and not hard IFSDs) for the first IFSD. However, after the initial IFSD, when cruising and eventually descending on a single engine, the crew would not shut the one remaining engine down or allow the one remaining engine down to stop producing thrust unless shutdown or stopping producing thrust is unavoidable. Therefore, a per-engine shutdown rate during the cruise phase $r_2$ (cruise IFSD rate) and a per-engine shutdown rate during the descent phase $r_2$ (descent IFSD rate), as explained below, of the second engine will be reduced by $K_N$ and $K_{ND}$ respectively. However, if the second engine shuts down after all attempts to keep the second engine running, the crew will attempt to restart the first engine that was shutdown in cruise. $K_N$ is the probability that the first engine will not be restartable. The default value of $K_N$, based on in-service experience in the 3 years ending June 2008, is 0.78, meaning 78% of cruise IFSDs are hard, and 22% are restartable (i.e., 5 of 23 were not hard).

The ETOPS IFSD risk calculator module 404 uses the descent IFSD rate $r_3$ as explained below for the first IFSD in descent. However, after this initial IFSD, when continuing descending on a single engine, the crew would not shut the one remaining engine down or allow the one remaining engine to stop producing thrust unless shutdown or stopping producing thrust were unavoidable. Therefore, the descent IFSD rate of the second engine will be reduced by $K_{ND}$. The default value of $K_{ND}$, based on in-service experience in the 3 years ending June 2008, is 1.0, meaning all 8 of the descent IFSDs were hard, and none were restartable.

The ETOPS IFSD risk calculator module 404 uses the per-engine shutdown rate during a climb phase $r_1$ (climb IFSD rate) as explained below for the first IFSD in climb. After this, the crew would not shut the one remaining engine down or allow the one remaining engine to stop producing thrust unless shutdown or stopping producing thrust is unavoidable. Therefore, ensuing cruise (with time to dump fuel to reduce landing weight) and the descent IFSD rate of the second engine are reduced by $K_N$ and $K_{ND}$ respectively. However, if the second engine shuts down after all attempts to keep the second engine running, the crew will attempt to restart the first engine that was shutdown. $K_{NT}$ is a probability that the first engine will not be restartable. The default value of $K_{NT}$, based on in-service experience in the 3 years ending June 2008, is 0.87, meaning 87% of climb IFSDs are hard, and 13% are restartable (i.e., 4 of 31 were not hard).

$K_S$ is a little lower in the early portion of flight because single engine cruise altitude is lower with a weight comprising most of the fuel remaining onboard. However, a reasonable default average is 0.6. That is, 60% of the time will be required to descend and land from a single-engine cruise altitude as from a two-engine cruise altitude.

$K_F$, approximates the IFSD rate averaged over the ETOPS flight as a whole (1,000× engine shutdowns/engine flight hours over entire ETOPS flights). The default value (0.004) is the average rate experienced on a particular aircraft type (both ETOPS flights and all flights) through 2008. A user may enter any desired value for IFSD rates in the input parameter module 416, and shutdown rates and risks in all phases will adjust proportionately in the ETOPS IFSD risk calculator module 404.

Default values for the aircraft model specific parameters on the ETOPS flight, which are set at predetermined default values, stored in the memory module 410, may be accepted by the user or adjusted as necessary. For example but without limitation, as shown in the current value column 502, a default value of $K_N$, is set to 0.78,, a default value of $K_{ND}$, is set to 1,, a default value of $K_{NT}$, is set to 0.87,, and a default value of $K_S$, is set to 0.6.

Once the aircraft model specific parameters are entered into the memory module 410, the flight specific data may be entered in order for risks to be calculated as explained in more detail below.

The predetermined two-engine aircraft/engine combination performance data set (flight specific data) may comprise, for example but without limitation, planned total flight time ($T_T$), ETOPS rule tme ($T_R$), ETOPS threshold time ($T_E$), average duration of the climb phase ($T_1$), projected time to land following an engine shutdown while in the climb phase ($T_{A1}$), normal time duration of Non-ETOPS early cruise phase ($T_2$), normal time duration of Non-ETOPS late cruise phase tme ($T_4$), normal time duration of two-engine descent phase time ($T_5$), average total-flight IFSD rate per engine flight hour ($K_F$) (user setable IFSD rate), single-engine-cruise shutdown-stress factor ($K_1$), and the like.

Default values of the flight specific data shown in the current value column 502, which are set at predetermined default values, stored in the memory module 410, may be accepted by the user or adjusted as necessary. For example, as shown in the current value column 502, the planned total flight time $T_T$, is set by the user to 9.1, hours. The default values of: $T_E$, is equal to 1, hour, $T_R$ is equal to 3, hours (180-minute ETOPS), $T_1$, is equal to 0.333, hours, $T_{A1}$, is equal to 0.7, hours, $T_2$, is equal to 2, hours, $T_4$, is equal to 2, hours, and $T_5$, is equal to 0.417, hours.

The planned total flight time $T_T$, is equal to a sum of the durations of all individual phases: $T_T=T_1+T_2+T_3+T_4+T_5$.

As mentioned above, $T_{A1}$, is the projected time to land following an engine shutdown while in the climb phase 306. Considering fuel dump time, a conservative estimate of an average of $T_{A1}$, is 42, minutes. If the probabilistic model assumes the average climb IFSD happens half way through climb, then the flight would be $T_1/2=0.333/2=0.167$, hours from the origin airport 302. However, there is another factor that lengthens a time to land. Early in the flight, the aircraft is heavy with fuel. To land that heavy may be non-optimal for the landing gear, and would require a costly, time-consuming inspection. To land light, the crew may usually elect to spend time dumping fuel into the atmosphere prior to landing. A lower limit (minimum limit) on $T_{A1}$, is a minimum time to land an aircraft that was climbing when an engine was shutdown and is about 0.1, hours (e.g., while at low altitude and close to an airport). An upper limit (maximum limit) on $T_{A1}$, considering fuel dump time, is about 1, hour (i.e., barring other factors).

Many real-world ETOPS routes have values of $T_2$, greater than 2 hours, some over 8, hours. User may select any $T_2$, within the range shown after $T_E$, and $T_1$, are entered. Smaller values equate to more flight time further from airports, so are a way to depict a worst-case scenario in this regard. A minimum limit of $T_2$, is calculated as $T_E-T_1$, (e.g., can be as low as zero if, in the unlikely event, the flight is still in the (initial) climb phase 306 when the flight enters the ETOPS phase 310). A maximum limit of $T_2$, is $T_T-2T_E$. In one embodiment, $T_T-T_E-T_1$, may be used as true upper limit of $T_2$. However, in practice the ETOPS IFSD risk calculator module 404 uses $T_T-2T_E$, as a more conservative upper limit of $T_2$.

$T_4$, is that portion of the flight that starts the last moment the closest airport ($A_E$) is more than the ETOPS threshold time away (usually one hour) as the flight then may cruise past alternate airports, and ends at the start of descent to land. A minimum limit on $T_4$, is calculated for the user to see as $T_E-T_5$. $T_4$ could be as low as zero if, in the unlikely event, the flight started descending to land while still in the ETOPS phase. However, a $T_4$, of zero may generally not occur in the ETOPS IFSD risk calculator module 404 when a normal descent time of 0.417, hours is used. A maximum limit on $T_4$, is calculated as $T_T-2T_E$.

$T_5$, may be constant for all flights (e.g., at 0.417, hours).

$K_1$, is the ratio of the per-engine engine-shutdown time-rate during single-engine low-altitude cruise with high thrust level to the per-engine engine-shutdown time-rate during 2-engine high-altitude cruise with normal cruise thrust level. Default value is 2, meaning that the stresses of single engine flight will double the probability of shutdown on the engine still running. According to engine manufacturers, $K_1$ is actually very close to one, not two, which is corroborated by a lack of any such event in history. Therefore, using this high value is a substantially strong measure of conservatism. The user may choose to adjust this ratio.

The flight times calculated by the ETOPS IFSD risk calculator module 404 may comprise, for example but without limitation, projected single-engine time to land while in the Non-ETOPS early cruise phase ($T_{A2}$), normal time duration of the ETOPS Phase ($T_3$), projected single-engine time to land while in the ETOPS Phase ($T_{A3}$), projected single-engine time to land while in the Non-ETOPS late cruise phase ($T_{A4}$), projected single-engine time to land while in the descent phase ($T_{A5}$), and the like. The flight times are explained in more detail a follows.

The projected single-engine time to land while in the Non-ETOPS early cruise phase $T_{A2}$, may be calculated as follows: $T_{A2}=0.7(T_E-K_ST_5)+K_ST_5$. This comprises drift-down from 2-engine cruise altitude, cruise at single engine altitude while dumping fuel, and descent to airport. Descent time from single engine cruise altitude is reduced from the normal time duration of two-engine descent phase $T_5$, by the factor $K_S$, (i.e., $K_ST_5$). If fuel dump time were not included, the average time would be closer to $K_ST_5$, than to $T_E$. There will often be airports within the range of descent ($K_ST_5$), but $T_E$, is a maximum rarely reached. Inclusion of fuel dump time drives the average (expected) time to land higher, closer to $T_E$. So, the factor of 0.7, adds a measure of conservativeness by increasing the exposure time above the average time indicated merely by the geometry of the location of the flight (which would be less than $0.5(T_E-K_ST_5)+K_ST_5$). $T_{A2}=0.7(T_E-K_ST_5)+K_ST_5$, is calculated.

A minimum limit of $T_{A2}$, is $T_5$, (i.e., descent time from 2-engine cruise altitude). A maximum limit of $T_E$, (Including fuel dump time) is described as follows. Engine-out cruise speed is slower than all-engine cruise speed, but this does not need to be accounted for here for three reasons. First, by definition, the flight is within $T_E$, (usually one hour), at engine-out speed, of an airport. Second, there is no cruise time simply to get to an airport in this scenario. After an IFSD, engine-out drift-down begins, which is nearly all-engine flight speed. The flight enters the (actual) descent phase 314 at some lower than normal altitude (single-engine cruise altitude) without losing appreciable speed. Third, fuel dump time is a far bigger factor. Fuel dump time drives the average time up from $T_5$, closer to $T_E$.

The normal time duration of the ETOPS Phase $T_3$, may be calculated as follows: $T_3=T_T-(T_1+T_2+T_4+T_5)$. $T_3$, is calculated as the difference between the total flight time (set by user) and the sum of all other phases. A lower limit on $T_3$, is zero for non-ETOPS flight. For ETOPS flight, $T_3$, must be >zero. An upper limit on $T_3$, is (planned total flight time $T_T$)$-2T_E$. For instance, the first and last hours of this theoretical flight with the longest possible ETOPS phase are the only portions where an airport is within an hour of flight at single-engine speed. There are very few if any routes where $T_3$, would approach this maximum, which would require the shortest possible lengths of both $T_2$, and $T_4$. Thus, by giving short values to $T_2$, and $T_4$, the user is selecting a worst-case scenario in this regard—selecting the longest possible ETOPS portion of flight, given the planned total flight time $T_T$, and ETOPS threshold $T_E$.

$T_{A3}$, is calculated as the lesser of: $[T_E+(T_3)/4]$ or $[T_E+0.6(T_R-T_E)]$ and is explained in more detail below in connection with two specific airports. The airport whose ETOPS threshold border marks the beginning of the ETOPS phase will be referred to as $A_B$. $A_B$, may be the origin airport 302 or an ETOPS alternate airport 304. The airport whose ETOPS threshold border marks the end of the ETOPS phase will be referred to as $A_E$. $A_E$, may be the destination airport 330 or an ETOPS alternate airport 326.

ETOPS flights with short ETOPS phases where the $T_R$, 318 borders of $A_B$, and $A_E$, intersect do not need any other ETOPS alternate airports within the ETOPS portion of flight. In calculating the projected time to land in this portion of flight, the ETOPS IFSD risk calculator module 404 assumes no other airports are available. Thus, when a diversion is necessary, the flight must either return to $A_B$ or proceed to $A_E$. This is a measure of conservatism, because other airports (e.g., 324 in FIG. 3) may be available to provide a closer (sooner) opportunity to land. When $T_3$, is zero (non-ETOPS flight) $T_{A3} \le T_E$, (and far less than $T_R$). As the ETOPS portion of flight (duration of $T_3$) expands from zero to $2(T_R-T_E)$, which is where the $T_R$, borders of $A_B$, and $A_E$, are tangent, the upper limit of $T_{A3}$ remains at $T_E+T_3/2$, and grows linearly from $T_E$, to $T_R$. During this time, the worst case average $T_{A3}$, assuming diversions must either return to $A_B$, or proceed to $A_E$ remains at $T_E+T_3/4$.

As the duration of $T_3$, expands beyond $2(T_R-T_E)$, other ETOPS alternate airports become necessary, and the equation below must be used. For $T_3$, durations beyond $2(T_R-T_E)$, the upper limit will of course remain at $T_R$, but the average $T_{A3}$, will normally remain below $T_E+(T_R-T_E)/2$. That is, the flight will on average be closer to an airport than half way between $T_E$, and $T_R$. The fact that portions of the ETOPS phase may be directly over an alternate airport skews the average time to land shorter than many routes would seem to indicate. However, for conservativeness, the ETOPS IFSD risk calculator module 404 uses the average $T_{A3}$, for $T_3$, over $2(T_R-T_E)$ as $T_E+0.6(T_R-T_E)$.

This is analogous to flights that stay far from airports as they travel between equal time points that are at or near $T_R$.

Because the $T_E+T_3/4$, equation above for the short ETOPS phases assumes no alternate airports other than $A_B$, and $A_E$, the $T_E+T_3/4$, equation is no longer applicable for longer ETOPS phases, and erroneously generates long diversion times. The $T_E+(T_R-T_E)/2$, equation above is not applicable for short ETOPS phases and erroneously generates long diversion times there. Therefore, the ETOPS IFSD risk calculator module 404 evaluates the output of both equations and selects the smallest $T_{A3}$. This automatically selects the appropriate average diversion time $T_{A3}$, for $T_3$.

To calculate and sum risks, the flight to landing is broken into two phases; single engine drift-down and cruise, and descent to landing. The descent to landing time from single engine altitude is $K_S$, times the descent to landing from normal cruise altitude $T_5$, ($K_S T_5$). Therefore, this time is removed from the above times to landing and counted separately as descent, which has different risks.

Counting the separate phases so the different risks can be shown, the lesser of $[T_E+(T_3)/4-K_S T_5]$ or $[T_E+0.6(T_R-T_E)-K_S T_5]$ is obtained and the descent time is $K_S T_5$.

A minimum limit of $T_{A3}$, is $T_5$. This is a rare occurrence, but the true minimum. Despite the fact that this is the ETOPS portion of flight, the flight may indeed be within descent time of an alternate airport (i.e., with diversion times beyond $T_E$, both before and after that point in the original flight plan).

It is possible for $T_{A3}$, to be slightly longer than $T_R$, because regulations do not include slowing to land in the distances calculated from $T_R$, for the operator's ETOPS flight plan. However, the extreme remoteness of this possibility along with its very small value and conservativeness elsewhere in these calculations removes it from consideration.

$T_{A4}$, is calculated as $(T_E+T_5)/2$. There may often be airports within the range of two-engine descent time, $T_5$, but $T_E$, is a maximum rarely experienced. Therefore, an average time to land will be closer to two-engine descent time $T_5$ than to $T_E$. However, for conservativeness, a projected time to land should be the average of $T_5$, and $T_E$. A minimum limit on $T_{A4}$, is $T_5$, (i.e., airport can be reached in normal descent time), and an upper limit on $T_{A4}$, is $T_E$, (i.e., the nearest airport is ETOPS threshold time $T_E$, away).

$T_{A5}$, is a calculated as $T_5/2$, (i.e., on average in the middle of descent). The limits are fixed at $T_5$, hours (top of descent), and zero time (landing). Therefore, for example, the average is $T_5/2=0.21$, hours. Since little thrust is required in the descent phase 314, a likelihood of unsatisfactory aircraft performance scenarios such as loss of thrust from single or dual engine operational anomalies is reduced; thereby there is less risk during the descent phase 314. It is possible that a second IFSD could happen during descent and the aircraft still land safely. A minimum limit on $T_{A5}$, is zero (i.e., first engine shuts down at landing). A maximum limit on $T_{A5}$, is 0.417, hours (i.e., first engine shuts down at the top of descent).

The average engine in-flight shutdown rates for various flight phases comprise climb phase engine shutdown rate $r_1$, (climb IFSD rate $r_1$) (per-engine shutdown rate during the climb phase $r_1$) representing shutdowns per engine climb hour, cruise phase engine shutdown rate $r_2$, (cruise IFSD rate $r_2$) (per-engine shutdown rate during the cruise phase $r_2$) representing shutdowns per engine high-altitude-cruise hour, and a descent phase engine shutdown rate $r_3$ (descent IFSD rate $r_3$) (per-engine shutdown rate during the descent phase $r_3$) representing shutdowns per engine descent & approach hour.

The climb IFSD rate $r_1$, is calculated based on average total-flight IFSD rate per engine flight hour ($K_F$) (either the default value or a value set by the user) times a constant (7.4) which is a historical weighting of the climb IFSD rate as compared to the average total-flight IFSD rate per engine flight hour ($K_F$) to obtain a un-scaled-$r_1$. The un-scaled-$r_1$, is then divided by 1,000, so users may enter familiar IFSD rates (per 1,000, engine flight hours) and the product is consistent.

One particular typical aircraft type has recorded 62, engine shutdowns in the 1,527,062, aircraft flights and 15,398,774, engine flight hours in the three years from 1, Jul. 2005, through 30, Jun. 2008. For this data, an average (total) IFSD rate=62(1,000)/15,398,774=0.00403, IFSDs per 1,000, engine flight hours. Half (i.e., 31, of the 62, shutdowns) either existed at or arose after liftoff and before the end of climb. Several events began in climb, but the engine was not shutdown until a later phase of flight (i.e., cruise, or descent to land back at the origin airport 302). All shutdowns were counted in a phase of the separate phases in which the engine was actually shutdown. For example, for the average duration of the climb phase $T_1$, of 20, minutes (⅓, hour), and accounting for two engines per aircraft, Climb IFSD rate $(r_1)$=31(1,000)/[(1,527,062)(2)(0.333)]=0.030, IFSDs per 1,000, engine climb hours.

The ETOPS IFSD risk calculator module 404 uses a constant ratio of climb IFSD rate to total IFSD rate. This constant ratio is then used to increase the average total IFSD rate by the historical proportion to derive the climb phase IFSD rate, for example:

Climb IFSD rate/total IFSD rate=constant, (e.g., 0.030/0.00403=7.4).

The constant ratio (divided by 1,000, to accommodate the familiar IFSD rate format entered by the user) is multiplied by the total IFSD rate ($K_F$) in the calculator to derive the climb IFSD rate used in the specific calculation.

Service experience shows that climb shutdowns tend to happen earlier in climb (i.e., more than half of climb IFSDs happen prior to half way through the climb phase 306). An IFSD prior to half way through the climb phase 306 would cause an average time to land after an IFSD in climb to be less than half way through the climb phase 306. However, as explained above, there is another factor that lengthens the time to land. Early in the flight, the aircraft is heavy with fuel. To land while very heavy risks damaging the landing gear, and requires a costly, time-consuming inspection. To avoid these problems, the crew will often elect to spend time dumping fuel into the atmosphere prior to landing. Considering fuel dump time, a conservative estimate of the average time to land after an IFSD in the climb phase 306 is 42, minutes. The ETOPS IFSD risk calculator module 404 used this value, but allows the user to choose a projected time ($T_{A1}$) to land following an engine shutdown while in the climb phase 306 from 0.1, hour up to one hour.

The cruise IFSD rate $r_2$, is calculated as the total IFSD rate ($K_F$) (either the default value or a value set by the user) times the constant (0.44) which is a historical weighting of the cruise IFSD rate $r_1$, as compared to the total IFSD rate ($K_F$) to obtain an un-scaled-$r_2$. The un-scaled-$r_2$, is then divided by 1,000, so users may enter familiar IFSD rates (per 1,000, engine flight hours) and the product is consistent.

One particular typical aircraft type has recorded 23, shutdowns between the top of the climb phase 306 and the start of the descent phase 314 during the 1,527,062, flights in the three years from 1, Jul. 2005, through 30, Jun. 2008. The average total flight time was 5.04, hours per flight (7,699,387, aircraft flight hours/1,527,062, aircraft flights). For example, if the average duration ($T_1$) of the climb phase 306 is 0.333, hours and an average value of the normal time duration of two-engine descent phase $T_5$, is 0.417, hours, and accounting for two engines per aircraft, an average value of the cruise IFSD rate $r_2$, is calculated as follows:

23/[(1,527,062)(2)(5.04−0.333−0.417)]=1.76(10⁻⁶)

Therefore, shutdowns per engine cruise hour=0.00176, per 1,000 engine flight hours in cruise.

The total IFSD rate $K_F$, for the ETOPS flight was shown above to be 0.00403, IFSDs per 1,000, engine flight hours for a typical aircraft type. The ETOPS IFSD risk calculator module 404 uses a constant ratio of the cruise IFSD rate $r_2$, to the total IFSD rate $K_F$. This constant ratio is then used to decrease the total IFSD rate ($K_F$) by the historical proportion to derive the cruise IFSD rate $r_2$, as follows:

Cruise IFSD rate/total IFSD rate=constant, (e.g., 0.00176/0.00403=0.44)

This constant ratio (divided by 1,000, to accommodate the familiar IFSD rate format entered by user) is multiplied by $K_F$, in the ETOPS IFSD risk calculator module 404 to derive the cruise IFSD rate used in the specific calculation.

Cruise is the most benign (least dynamic) of the flight phases for the engine, and is also the longest duration of the flight phases. The benign nature of the cruise phase and the long duration combine to lower the cruise IFSD rate $r_2$, as compared to the total IFSD rate $K_F$. In recent years, as ETOPS maintenance practices have improved, there has been proportionately less maintenance caused IFSDs that tend to show up earlier in flight—usually in climb. Therefore, the climb IFSD rate $r_1$, is improving and the cruise IFSD rate $r_2$ is moving closer to the total IFSD rate $K_F$. However, the latest cruise rates are still about half (0.44) of the total rate.

The descent IFSD rate $r_3$, is calculated based on the given total IFSD rate $K_F$, (either the default value or a value set by the user) times a constant (1.6) which is the historical weighting of descent and approach IFSD rate as compared to total IFSD rate. It is then divided by 1,000, so users may enter familiar IFSD rates (per 1,000, engine flight hours) and the product is consistent. For example, one particular aircraft type has recorded eight shutdowns between start of descent and landing in the 1,527,062, flights in the three years from 1, Jul. 2005 through 30, Jun. 2008. If the normal time duration of two-engine descent phase time $T_5$, is an average of 25, minutes (0.417, hours) and accounting for two engines per aircraft, the average descent IFSD rate $r_3$, is calculated as follows:

8/[(1,527,062)(2)(0.417)]=6.28(10⁻⁶)

Therefore, shutdowns per engine descent hour=0.00628per 1,000 engine flight hours in descent.

The ETOPS IFSD risk calculator module 404 uses a constant ratio of the descent IFSD rate $r_3$, to the total IFSD rate $K_F$. The constant ratio is then used to increase the total IFSD rate $K_F$, by the historical proportion to derive the descent IFSD rate $r_3$, for example:

Descent IFSD rate/total IFSD rate=constant (e.g., 0.00628/0.00403=1.6).

This constant (divided by 1,000, to accommodate the familiar IFSD rate format entered by user) is multiplied by $K_F$, in the ETOPS IFSD risk calculator module 404 to derive the descent IFSD rate $r_3$, used in the specific calculation.

Hard IFSD is "an engine shutdown which cannot be safely restarted and operated up to maximum continuous thrust for an extended period of time" (i.e., "non-restartable" IFSD). Hard or non-restartable engine shutdowns sometimes can be restarted (i.e., some have even provided critical thrust in an emergency) but to do so may be considered non-optimal operation, may provide less than maximum thrust, and/or may cause engine operational anomalies. For the sake of conservatism, the ETOPS IFSD risk calculator 404 does not calculate the possibility of restarting hard IFSDs, and assumes all hard IFSDs (non-restartable engines) will not run again for the duration of the flight.

FIG. 6 is an illustration of an exemplary output parameter table 600 of the ETOPS IFSD risk calculator system 400 showing probabilities in column 602 and 606 and their calculated values in column 604 according to an embodiment of the disclosure. The output parameter table 600 may comprise values indicating, for example but without limitation: probability of a total thrust loss from dual independent engine shutdowns starting during the climb phase ($P_1$); probability of total thrust loss from dual independent engine shutdowns starting during the Non-ETOPS early cruise phase ($P_2$); probability of total thrust loss from dual independent engine shutdowns starting during the ETOPS phase ($P_3$); probability of total thrust loss from dual independent engine shutdowns starting during the Non-ETOPS late cruise phase ($P_4$); probability of total thrust loss from dual independent engine shutdowns starting during the descent phase ($P_5$); probability of total thrust loss from dual independent engine shutdowns starting at any time during the entire ETOPS flight (total probability) ($P_T$); per-flight-hour probability of total thrust loss from dual independent engine shutdowns, averaged over the entire flight ($P_A$); per-flight-hour probability of total thrust loss from dual independent engine shutdowns, averaged over the ETOPS phase ($P_E$); and the like. In this document, "total thrust loss" means permanent (non-restartable) loss of thrust from both engines, and starting means with the first engine shutdown arising.

$P_T$, is the calculated per-flight probability of a complete and permanent loss of aircraft thrust. $P_T = P_1 + P_2 + P_3 + P_4 + P_5$, the total probability ($P_T$) of a dual independent engine shutdown at any time during the entire flight is equal to the sum of the probabilities in all the flight phases (FIG. 3).

$P_A$, is a calculated average per-flight-hour probability of a complete and permanent loss of aircraft thrust, averaged over the entire flight. $P_A = P_T/T_T$, thus $P_A$, is a per-flight-hour probability of total thrust loss from dual independent engine shutdowns averaged over the entire flight, and $P_A$, is equal to the total probability $P_T$, divided by the planned total flight time $T_T$.

$P_E$, is a calculated per-flight-hour probability of a complete and permanent loss of aircraft thrust in the ETOPS phase 310 (FIG. 3) of flight only. $P_E = P_3/T_3$, thus $P_E$, is a per-flight-hour probability of total thrust loss from dual independent engine shutdowns averaged over the ETOPS phase 310 of flight, and $P_E$, is the probability $P_3$, divided by the duration $T_3$, of the ETOPS phase 310.

Following are event sequences describing probability of engine shutdowns for the five phases of an ETOPS flight that can be calculated by the ETOPS IFSD risk calculator module 404 according to embodiments of the disclosure.

Event sequences with a first engine shutdown arising during the climb phase 306 is as follows:

A first engine operational anomaly arises during the climb phase 306 and the engine is shutdown with a probability=$2r_1T_1$. This probability of an initial IFSD is based upon two engines operating during takeoff and climb, the per-engine shutdown rate during the climb phase ($r_1$), and the average duration of the climb phase ($T_1$) of the (normal) climb phase 306.

The remaining engine shuts down while the aircraft flies with one-engine out for $T_{A1}$, hours to dump fuel and land with a following probability:

$P_{1b} = (T_{A1}-K_ST_5)(K_1K_N)r_2+(K_ST_5K_{ND})r_3$, where $P_{1b}$, is a probability of a second IFSD after a first engine shutdown occurred in the climb phase 306.

This probability of a second IFSD is based on the first IFSD in the climb portion being followed by single-engine cruise while dumping fuel to avoid an overweight landing and $K_ST_5$, hours to descend and touch down at an airport. Initial IFSD to the projected time to land following an engine shutdown while in the climb phase $T_{A1}$, may be set by user, but default is 0.7, hours. Single-engine cruise time is $T_{A1}-K_ST_5$. Single-engine cruise IFSD rate is $(K_1)(K_N)r_2$, where $r_2$, is the cruise IFSD rate and $K_1$, is the factor accounting for the increased stress on the single remaining operating engine, and $K_N$, is the factor that eliminates unnecessary IFSDs from 2nd IFSDs in cruise. So the cruise portion shutdown rate is $(T_{A1}-K_ST_5)(K_1)(K_N)r_2$. The descent portion shutdown rate is $(K_ST_5K_{ND})r_3$.

The first engine shutdown will not restart with a Probability=$K_{NI}$. $K_{NI}$ is the probability that the first engine, which was shutdown in climb, will not be restartable.

$P_1$, is a probability of the total thrust loss from dual independent engine shutdowns starting during the climb phase 306. This probability is the product of the three probabilities occurring previously: 1) a first engine operational anomaly arises during the climb phase 306 and the engine is shut down. Probability=$2r_1T_1$; 2) the remaining engine shuts down while the airplane flies with one-engine out for $T_{A1}$, hours to dump fuel and land. Probability=$(T_{A1}-K_ST_5)(K_1K_N)r_2+(K_ST_5, K_{ND})r_3$; and 3) the first engine shut down won't restart. Probability=$K_{NI}$. Each of these probabilities is conditional upon assuming that events (if any) arose previously and in the time sequence. Therefore, $P_1 = 2r_1T_1[(T_{A1}-K_ST_5)K_1K_Nr_2+(K_ST_5K_{ND})r_3]K_{NI}$.

Event sequences with a first engine shutdown arising during the Non-ETOPS early cruise phase 308:

A first engine operational anomaly arises during the Non-ETOPS early cruise phase 308 and the engine is shutdown, and Probability=$2r_2T_2$. This probability of an initial IFSD is based upon two engines operating during high-altitude cruise, the per-engine shutdown rate during the climb phase $r_2$, (engine shutdowns per engine high-altitude-cruise hour), and the normal time duration of Non-ETOPS early cruise phase $T_2$.

The aircraft heads for the nearest airport and the remaining engine shuts down before landing with a following probability:

$P_{2b} = K_1K_Nr_2*0.7(TE-K_ST_5)+r_3K_NK_ST_5$, where $P_{2b}$, is a probability of a second IFSD after a first engine shutdown occurred in the Non-ETOPS early cruise phase 308.

This probability of a second IFSD is based upon the following:

(1) a previous engine shutdown being followed immediately by the flight heading towards the nearest suitable airport, (2) a time $0.7(T_E-K_ST_5)+K_ST_5$, spent flying to and landing at the nearest airport. The factor of 0.7, is a conservative acknowledgement that fuel dump time or other situations may increase the single-engine flight time above the statistical average of 0.5, hours. Time from top of descent at normal two-engine cruise to landing is $T_5$. From top of descent at the lower single engine altitude to landing is $K_ST_5$. So, the single-engine cruise time is $0.7(T_E-K_ST_5)$, (3) a time $K_ST_5$, remains for descending to land, (4) an engine shutdown rate per engine low-altitude-cruise hour which is increased by a factor of $K_1$, over the per-engine shutdown rate during the climb phase $r_2$, (engine shutdowns per engine high-altitude-cruise hour), and decreased by a factor of $K_N$, over the first shutdown (no unnecessary IFSDs on second IFSD), and (5) a per-engine descent shutdown rate $r_3$, reduced by $K_N$, over a shortened descent time $K_S T_5$.

In practice, the single-engine flight to landing comprises fuel dump time during a slow descent (driftdown) to the top of descent (at a low altitude) to the nearest airport, and then completion of descent from that lower altitude to landing. The preceding two-segment discrete model may be considered to fairly represent engine shutdown stresses during the trip.

The first engine shutdown will not restart with a probability=$K_N$. $K_N$, is the probability that the first engine shutdown will not be re-startable.

Total thrust loss probability=$P_2$. This probability is the product of the three probabilities occurring previously: 1) a first engine operational anomaly arises during the Non-ETOPS early cruise phase 308 and the engine is shut down. Probability=$2r_2 T_2$; 2) The airplane heads for the nearest airport and the remaining engine is shut down before touchdown. Probability=$K_1 K_N r_2 0.7(T_E - K_S T_5) + r_3 K_N K_S T_5$; and 3) the first engine shut down won't restart. Probability=$K_N$. Each of these three probabilities is conditional upon assuming that events (if any) arose previously and in the time sequence. Therefore, $$P_2 = 2r_2 T_2 [K_1 K_N r_2 * 0.7(T_E - K_S T_5) + r_3 K_{ND} K_S T_5]/K_N$$

Event sequences with a first engine shutdown arising during the ETOPS phase 310:

A first engine operational anomaly arises during the ETOPS Phase, and the engine is shutdown probability=$2r_2 T_3$. This probability of an initial IFSD is based upon two engines operating during high-altitude cruise, engine shutdowns per engine high-altitude-cruise hour/per-engine shutdown rate during the cruise phase $r_2$, and the normal time duration of the ETOPS phase $T_3$.

The flight heads towards the nearest suitable airport and the remaining engine shuts down before landing with the following probability:

$P_{3b}$, is the lesser of: $[K_1 K_N r_2 (T_E + (T_3)/4 - K_S T_5)]$ or $[K_1 K_N r_2 (T_E + 0.6(T_R - T_E) - K_S T_5)] + r_3 K_{ND}, K_S T_5$, where $P_{3b}$, is a probability of a second IFSD after a first engine shutdown occurred in the ETOPS phase 310.

This probability of a second IFSD is based upon:

(1) the previous engine shutdown in the ETOPS portion of flight being followed immediately by the flight heading towards the nearest suitable airport;

(2) a time of the lesser of: $[T_E + (T_3)/4]$ or $[T_E + 0.6(T_R - T_E)]$ to reach the nearest airport (depending on the size of the ETOPS portion of flight); $T_5$, is the time from top of descent at normal two-engine cruise to landing. $K_S T_5$, is the time from top of descent at the lower single engine altitude to landing. Thus, the single-engine cruise time is the lesser of the two times above, but each reduced by the descent time $K_S T_5$.

(3) a per engine shutdown rate per engine low-altitude cruise hour which is increased by the stress factor of $K_1$, over the high-altitude two-engine cruise rate $r_2$, and decreased by a factor of $K_N$, over the first shutdown (no unnecessary IFSDs on second IFSD) for the cruise portion; and (4) a per-engine descent shutdown rate $r_3$, over a descent time of $K_S T_5$ decreased by a factor of $K_{ND}$, over the first shutdown (no unnecessary IFSDs on second IFSD) for descent portion.

The first engine shutdown will not restart with a probability $K_N$. $K_N$, is the probability that the first engine shutdown will not be restartable.

$P_3$, is a probability of a total thrust loss from dual independent engine shutdowns starting during the ETOPS phase 310. This probability is the product of the three probabilities occurring previously: 1) a first engine operational anomaly arises during the ETOPS phase 310, and the engine is shut down. Probability=$2r_2 T_3$; 2) the flight heads towards the nearest suitable airport and the remaining engine shuts down before touchdown. Probability=the lesser of: $[K_1 K_N r_2 (T_E + (T_3)/4 - K_S T_5)]$ or $[K_1 K_N r_2 (T_E + 0.6(T_R - T_E) - K_S T_5)] + r_3 K_{ND}, K_S T_5$; and 3) the first engine shut down won't restart. P=$K_N$. Each of these probabilities is conditional upon assuming that events (if any) arose previously and in the time sequence. Therefore:

$$P_3 = 2r_2 T_3 ([K_1 K_N r_2 (T_E + T_3/4 - K_S T_5)] \text{ or } [K_1 K_N r_2 (T_E + 0.6(T_R - T_E) - K_S T_5)] + r_3 K_{ND} K_S T_5) K_N.$$

Since $T_{A3}$, is equal to the lesser of $T_E + (T_3)/4$, or $T_E + 0.6 (T_R - T_E)$, $T_{A3}$ may be substituted above, so $$P_3 = 2r_2 T_3 ((K_1 K_N r_2 (T_{A3} - K_S T_5)) + r_3 K_{ND} K_S T_5) K_N.$$

Event sequences with first engine shutdown arising during the Non-ETOPS late cruise phase 312:

A first engine operational anomaly arises during the Non-ETOPS late cruise phase 312 and the engine is shutdown with a probability=$2r_2 T_4$.

The aircraft flies toward the nearest airport but the remaining engine shuts down before landing.

$$P_{4b} = K_1 K_N r_2 (T_E + T_5)/2 - K_S T_5) + r_3 K_{ND} K_S T_5,$$

where $P_{4b}$, is a probability of a second IFSD after a first engine shutdown occurred in the Non-ETOPS late cruise phase 312.

The first engine shutdown won't restart with a probability=$K_N$. $K_N$, is the probability that the first engine shutdown will not be restartable.

$P_4$, is a probability of total thrust loss from dual independent engine shutdowns starting during the Non-ETOPS late cruise phase 312. This probability is the product of the three probabilities occurring previously: 1) a first operational anomaly arises during the Non-ETOPS late cruise phase 312 and the engine is shut down. Probability=$2r_2 T_4$; 2) The airplane flies toward the nearest airport but the remaining engine fails before touchdown. Probability=$K_1 K_N r_2 (T_E + T_5)/2 - K_S T_5) + r_3 K_{ND} K_S T_5$; and 3) the first engine shut down won't restart. P=$K_N$. Each of these probabilities is conditional upon assuming that events (if any) arose previously and in the time sequence. Therefore, $$P_4 = 2r_2 T_4 [K_1 K_N r_2 ((T_E + T_5)/2 - K_S T_5) + r_3 K_{ND} K_S T_5]/K_N$$

Event sequences with a first engine shutdown arising during the descent phase 314:

A first engine operational anomaly arises during the descent phase 314 and the engine is shutdown with a probability P=$2r_3 T_5$. This probability of an initial IFSD is based upon two engines operating at the end of cruise, but one engine shutting down some time in descent, the per-engine shutdown rate during the descent phase $r_3$, (engine shutdowns per engine descent hour), and the normal time duration of two-engine descent phase $T_5$.

The remaining engine shuts down before landing at the destination airport with a probability, $$P_{5b} = K_{ND} r_3 (T_5/2),$$

where $P_{5b}$, is a probability of a second IFSD after a first engine shutdown occurred in the descent phase 314.

This probability of a second IFSD is based upon the previous engine shutdown having arisen on average half-way through $T_5$, thus the time remaining to descend and touch down at the original destination airport is $T_5/2$,, the engine shutdowns per engine descent hour $r_3$, decreased by a factor of $K_{ND}$, over the first shutdown (no unnecessary IFSDs on second IFSD).

The first engine shutdown won't restart with probability of $P=K_{ND}$. This is the probability that the first engine shutdown will not be restartable.

$P_5$, is a probability of total thrust loss from dual independent engine shutdowns starting during the descent phase 314. This probability is the product of the three probabilities occurring previously: 1) a first engine operational anomaly arises during the descent phase 314 and the engine is shut down. $P=2r_3T_5$; 2) the remaining engine shuts down before touchdown at the destination airport. $P=K_{ND}r_3(T_5/2)$; and 3) The first engine shut down won't restart. $P=K_N$. Each of these probabilities is conditional upon assuming that events (if any) arose previously and in the time sequence. It is also possible that despite losing thrust from both engines, the flight could land safely, since the aircraft was already on approach when each engine was shutdown.

$$P_5=(2r_3T_5)(K_{ND}r_3(T_5/2))K_{ND}=(r_3T_5K_{ND})^2.$$

The ETOPS IFSD risk calculator module 404 is used to perform calculations for various ETOPS routes. The ETOPS IFSD risk calculator module 404 considerably expedites verification of calculations as described herein.

FIG. 7 is an illustration of the exemplary-output parameter table 700 of the ETOPS IFSD risk calculator module 404 showing cumulative risk progression values according to an embodiment of the disclosure. Column 702 shows the elapsed flight time in hours, and column 704 shows values of cumulative risk at the end of each phase of flight calculated by the ETOPS IFSD risk calculator module 404. For example, at elapsed time 0.333, hours (the end of the climb phase 306) the cumulative risk is equal to the climb phase risk $P_1$. At elapsed time 2.333, hours (the end of the Non-ETOPS early cruise phase 308), the cumulative risk is equal to the Non-ETOPS early cruise phase risk $P_2$, added to $P_1$. At elapsed time 6.683, hours, the cumulative risk is equal to ETOPS phase risk $P_3$, added to $P_2$, and $P_1$. At elapsed time 8.683, hours (the end of the Non-ETOPS late cruise phase 312), the cumulative risk is equal to Non-ETOPS late cruise phase risk $P_4$, added to $P_3$, $P_2$, and $P_1$. In addition, the cumulative risk $P_T$, is the descent phase risk $P_5$, added to $P_4$, $P_3$, $P_2$, and $P_1$. The cumulative probabilities calculated by the ETOPS IFSD risk calculator module 404 shown in FIG. 7 are in order of $10^{-10}$, which are substantially less than $10^{-9}$, value considered acceptable for aircraft operations. This lower risk demonstrated by the ETOPS IFSD risk calculator module 404 encourages and enables regulators to allow shorter flights, requiring less fuel and time. FIGS. 8 and 9 show the cumulative risks presented on a display screen 414.

FIG. 8 is an illustration of exemplary graphical output 800 of the summed risks, shown in the output parameter table of FIG. 7, presented on the display screen 414 using a bar chart graph according to an embodiment of the disclosure. FIG. 8 shows the individual risks for the climb phase 806/306, the Non-ETOPS early cruise phase 808/308, the ETOPS phase 810/310, the Non-ETOPS late cruise phase 812/312, and the descent phase 814/314.

FIG. 9 is an illustration of an exemplary graphical output 900 of the cumulative risk progression of all phases of an ETOPS flight, driven by the output parameter table of FIG. 7 and presented on the display screen 414 using a linear graph 902 according to an embodiment of the disclosure. Steeper rises equate to faster accumulation of risk.

FIG. 10 is an illustration of exemplary parameter table 1000 presented on the display screen 414 according to an embodiment of the disclosure. The parameter table 1000 is derived from the input parameter table 500 (i.e., from the current column 502) and the output parameter table 600 (i.e., $P_A$, 608) presented as a convenience for the user, so the parameters are properly associated with the graphs.

Figure 11:
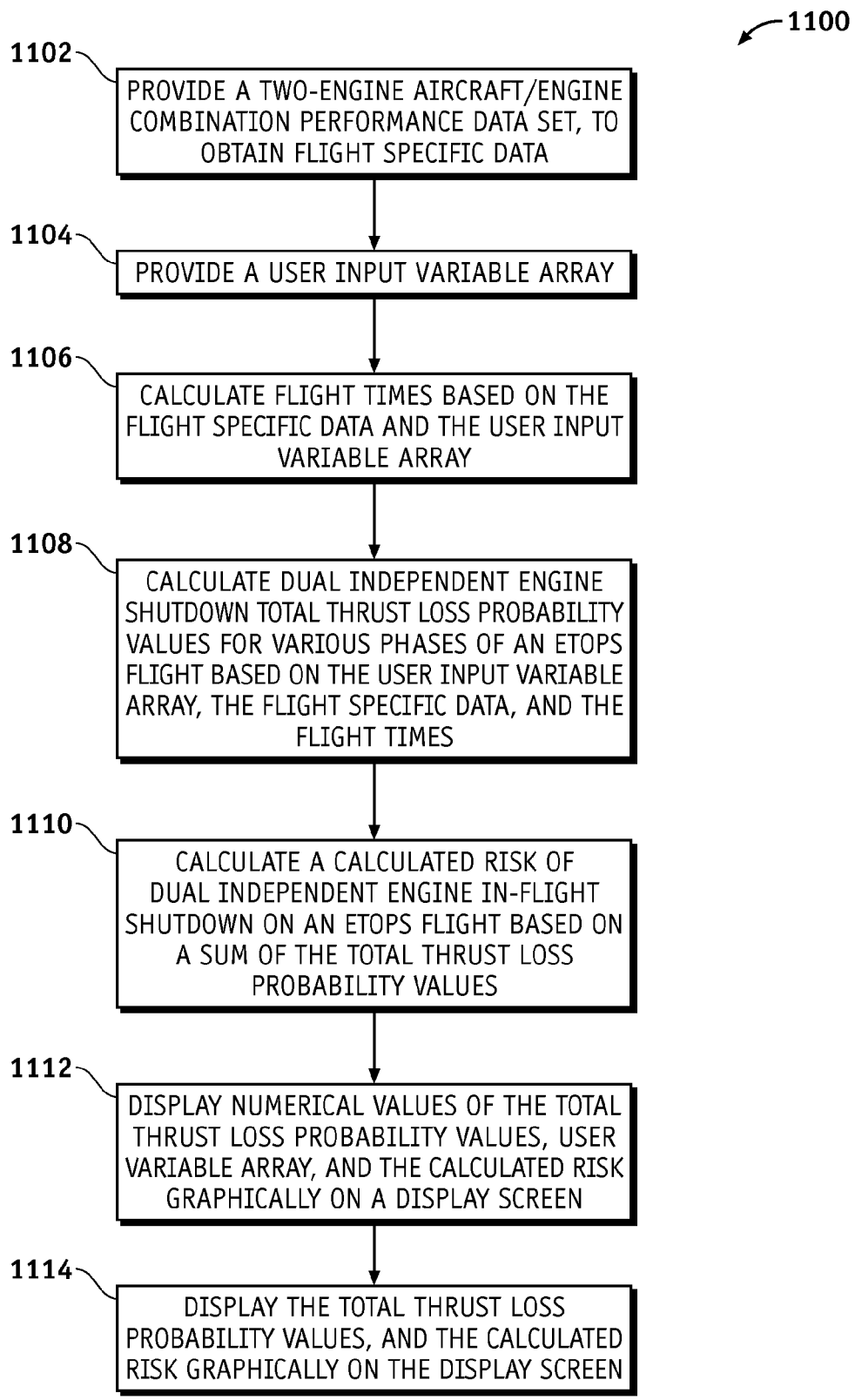
FIG. 11 is an illustration of an exemplary flow chart showing a process for analyzing a risk of extended operations (ETOPS) dual independent engine in-flight shutdown (IFSD) according to an embodiment of the disclosure.

FIG. 11 is an illustration of an exemplary flow chart showing a process 1100 for analyzing a risk of extended operations (ETOPS) dual independent engine in-flight shutdown (IFSD) that can be used suitably by the ETOPS IFSD risk analyzer system 400 according to an embodiment of the disclosure. The various tasks performed in connection with the process 1100 may be performed by software, hardware, firmware, a computer-readable medium having computer executable instructions for performing the process method, or any combination thereof. The process 1100 may be recorded in a computer-readable medium such as a semiconductor memory, a magnetic disk, an optical disk, and the like, and can be accessed and executed, for example, by a computer CPU such as the processor module 408 in which the computer-readable medium is stored. It should be appreciated that process 1100 may include any number of additional or alternative tasks, the tasks shown in FIG. 11 need not be performed in the illustrated order, and process 1100 may be incorporated into a more comprehensive procedure or process having additional functionality not described in detail herein. For illustrative purposes, the following description of process 1100 may refer to elements mentioned above in connection with FIGS. 3-10. In practical embodiments, portions of the process 1100 may be performed by different elements of the system 400 such as the input module 402, the ETOPS IFSD risk calculator module 404, the display module 406, the processor module 408, and the memory module 410. Process 1100 may have functions, material, and structures that are similar to the embodiments shown in FIGS. 1-10. Therefore common features, functions, and elements may not be redundantly described here.

Process 1100 may begin by providing a two-engine aircraft/engine combination performance data set to obtain the flight specific data (task 1102) as explained above.

Process 1100 may then continue by providing a user input variable array (task 1104) as explained above. The user input variable array may at least comprise an average engine in-flight shutdown rate, an average duration of the climb phase 306, an ETOPS rule time; and the planned total flight time.

Process 1100 may then continue by calculating flight times based on the user input variable array and the flight specific data for various flight phases (task 1106).

Process 1100 may then continue by calculating dual independent engine shutdown total thrust loss probability values for various phases of the ETOPS flight based on the user input variable array, the flight specific data, and the flight times (task 1108).

Process 1100 may then continue by calculating, a calculated risk of dual independent engine in-flight shutdown (IFSD) on the ETOPS flight based on the total thrust loss probability values (task 1110) using ETOPS IFSD risk calculation means such as the ETOPS IFSD risk calculator module 404.

Process 1100 may then continue by displaying a numerical value of the total thrust loss probability values, the user variable array, and the calculated risk on the display screen 414 (task 1112).

Process 1100 may then continue by displaying the total thrust loss probability values, the user variable array, and the calculated risk graphically on the display screen 414 (task 1114).

In this way, various embodiments of the disclosure encourage and enable aircraft regulators to allow shorter flights, reduced fuel consumption, higher payload range, and lower flight times for two-engine ETOPS operations. The embodiments provide a fast method for regulators, operators, aircraft manufacturers, and engine manufacturers to observe an actual effect of many flight parameters on risk and ETOPS operations. Regulators can confidently approve ETOPS operations around the world. Operators can apply for new operations, showing their regulators how safe they can be. Manufacturers can get approval for more and longer ETOPS operations for their aircraft.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according the embodiments of the present disclosure.

In this document, the terms "computer program product", "computer-readable medium", and the like may be used generally to refer to media such as, for example, memory, storage devices, or storage unit. These and other forms of computer-readable media may be involved in storing one or more instructions for use by the processor module 408 to cause the processor module 408 to perform specified operations. Such instructions, generally referred to as "computer program code" or "program code" (which may be grouped in the form of computer programs or other groupings), when executed, enable the method of analyzing the risk of extended operations (ETOPS) dual independent engine in-flight shutdown (IFSD) using the ETOPS IFSD risk calculation means of the system 400.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-10 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A method of calculating a risk of a dual independent engine shutdown sequence during a predefined ETOPS flight of a two-engine aircraft, the predetermined ETOPS flight including takeoff from an origin airport and touchdown at a destination airport, the method comprising:

calculating a probability of a dual independent engine shutdown sequence for each of a climb phase, a non-ETOPS early cruise phase, an ETOPS phase, a non-ETOPS late cruise phase and a descent phase into which the predefined ETOPS flight is divisible, the dual independent engine shutdown sequence being composed of a sequence of events that for each phase is mutually exclusive of others of the phases, the sequence of events for a phase including events having respective, conditional probabilities the product of which is the probability of the shutdown sequence for the respective phase;

calculating the risk of the dual independent engine shutdown sequence during the predefined ETOPS flight as a function of the sum of the probabilities for the phases; and communicating the risk for display, wherein the dual independent engine shutdown sequence is composed of a sequence of events that for each phase includes a third event of an inability of a first engine to restart after shutdown during the predefined ETOPS flight, and after a non-restartable second engine shutdown before touchdown at the destination airport or an alternate airport, wherein the method further comprises calculating the conditional probability of the third event for each phase, the conditional probability of the third event for a phase being calculated as the ratio of a non-restartable engine shutdown rate to total engine shutdown rate for the respective phase, the ratio for at least some of the phases being separate and independent, and wherein operations including calculating the probability, calculating the risk, communicating the risk and calculating the conditional probability are performed by a system including a processor and storage medium coupled to the processor and having computer program code stored therein that, in response to execution by the processor causes the s stem to perform the respective operations.

2. The method of claim 1,
wherein the dual independent engine shutdown sequence is composed of a sequence of events that for each phase includes in sequence, a first engine shutdown during the predefined ETOPS flight, a non-restartable second engine shutdown before touchdown at the destination airport or an alternate airport, and the third event of an inability of the first engine to restart.

3. The method of claim 1, wherein the sequence of events for each phase further includes a first event of the first engine shutdown during the predefined ETOPS flight, and
wherein the method further comprises calculating the conditional probability of the first event for each phase, the conditional probability of the first event for a phase being calculated as a function of the product of an engine shutdown rate for the respective phase and a time duration of the respective phase, the engine shutdown rate for at least some of the phases being separate and independent.

4. The method of claim 3 further comprising:
receiving input including at least the engine shutdown rate for each phase, the engine shutdown rate for a phase being a function of a historical weighting of engine shutdown rates for the respective phase, the historical weighting being specific to a model of the two-engine aircraft.

5. The method of claim 1,
wherein the dual independent engine shutdown sequence is composed of a sequence of events that for each phase further includes a second event of the non-restartable second engine shutdown after the first engine shutdown during the predefined ETOPS flight, and before touchdown at the destination airport or an alternate airport, and
wherein the method further comprises calculating the conditional probability of the second event for each phase, the conditional probability of the second event being calculated as a function of a projected time duration to touchdown at the destination airport or alternate airport, the projected time duration of each phase being separate and independent.

6. The method of claim 1 further comprising:
receiving input including at least the ratio of a non-restartable engine shutdown rate to total engine shutdown rate for each phase, the ratio of a non-restartable engine shutdown rate to total engine shutdown rate for each phase being established by experience and specific to a model of the two-engine aircraft.

7. A system for calculating a risk of a dual independent engine shutdown sequence during a predefined ETOPS flight of a two-engine aircraft, the predetermined ETOPS flight including takeoff from an origin airport and touchdown at a destination airport, the system comprising:
a processor; and
a storage medium coupled to the processor and having computer program code stored therein that, in response to execution by the processor, causes the system to at least:
calculate a probability of a dual independent engine shutdown sequence for each of a climb phase, a non-ETOPS early cruise phase, an ETOPS phase, a non-ETOPS late cruise phase and a descent phase into which the predefined ETOPS flight is divisible, the dual independent engine shutdown sequence being composed of a sequence of events that for each phase is mutually exclusive of others of the phases, the sequence of events for a phase including events having respective, conditional probabilities the product of which is the probability of the shutdown sequence for the respective phase; and
calculate the risk of the dual independent engine shutdown sequence during the predefined ETOPS flight as a function of the sum of the probabilities for the phases; and
communicate the risk for display,
wherein the dual independent engine shutdown sequence is composed of a sequence of events that for each phase includes a third event of an inability of a first engine to restart after shutdown during the predefined ETOPS flight, and after a non-restartable second engine shutdown before touchdown at the destination airport or an alternate airport, and
wherein the storage medium has further computer program code stored therein that, in response to execution by the processor, causes the system to further calculate the conditional probability of the third event for each phase, the conditional probability of the third event for a phase being calculated as the ratio of a non-restartable engine shutdown rate to total engine shutdown rate for the respective phase, the ratio for at least some of the phases being separate and independent.

8. The system of claim 7,
wherein the dual independent engine shutdown sequence is composed of a sequence of events that for each phase includes in sequence, a first engine shutdown during the predefined ETOPS flight, a non-restartable second engine shutdown before touchdown at the destination airport or an alternate airport, and the third event of an inability of the first engine to restart.

9. The system of claim 7, wherein the sequence of events for each phase further includes a first event of the first engine shutdown during the predefined ETOPS flight, and
wherein the storage medium has further computer program code stored therein that, in response to execution by the processor, causes the system to further calculate the conditional probability of the first event for each phase, the conditional probability of the first event for a phase being calculated as a function of the product of an engine shutdown rate for the respective phase and a time duration of the respective phase, the engine shutdown rate for at least some of the phases being separate and independent.

10. The system of claim 9, wherein the storage medium has further computer program code stored therein that, in response to execution by the processor, causes the system to further:
receive input including at least the engine shutdown rate for each phase, the engine shutdown rate for a phase being a function of a historical weighting of engine shutdown rates for the respective phase, the historical weighting being specific to a model of the two-engine aircraft.

11. The system of claim 7,
wherein the dual independent engine shutdown sequence is composed of a sequence of events that for each phase further includes a second event of the non-restartable second engine shutdown after the first engine shutdown during the predefined ETOPS flight, and before touchdown at the destination airport or an alternate airport, and
wherein the storage medium has further computer program code stored therein that, in response to execution by the processor, causes the system to further calculate the conditional probability of the second event for each phase, the conditional probability of the second event being calculated as a function of a projected time duration to touchdown at the destination airport or alternate airport, the projected time duration of each phase being separate and independent.

12. The system of claim 7, wherein the storage medium has further computer program code stored therein that, in response to execution by the processor, causes the system to further:
receive input including at least the ratio of a non-restartable engine shutdown rate to total engine shutdown rate for each phase, the ratio of a non-restartable engine shutdown rate to total engine shutdown rate for each phase being established by experience and specific to a model of the two-engine aircraft.

13. A storage medium for calculating a risk of a dual independent engine shutdown sequence during a predefined ETOPS flight of a two-engine aircraft, the predetermined ETOPS flight including takeoff from an origin airport and touchdown at a destination airport, the storage medium being non-transitory and having computer-readable program code stored therein that, in response to execution by a processor, cause a system to at least:
calculate a probability of a dual independent engine shutdown sequence for each of a climb phase, a non-ETOPS early cruise phase, an ETOPS phase, a non-ETOPS late cruise phase and a descent phase into which the predefined ETOPS flight is divisible, the dual independent engine shutdown sequence being composed of a sequence of events that for each phase is mutually exclusive of others of the phases, the sequence of events for a phase including events having respective, conditional probabilities the product of which is the probability of the shutdown sequence for the respective phase;
calculate the risk of the dual independent engine shutdown sequence during the predefined ETOPS flight as a function of the sum of the probabilities for the phases; and
communicate the risk for display,
wherein the dual independent engine shutdown sequence is composed of a sequence of events that for each phase includes a third event of an inability of a first engine to restart after shutdown during the predefined ETOPS flight, and after a non-restartable second engine shutdown before touchdown at the destination airport or an alternate airport, and
wherein the storage medium has further computer program code stored therein that, in response to execution by the processor, causes the system to further calculate the conditional probability of the third event for each phase, the conditional probability of the third event for a phase being calculated as the ratio of a non-restartable engine shutdown rate to total engine shutdown rate for the respective phase, the ratio for at least some of the phases being separate and independent.

14. The storage medium of claim 13,
wherein the dual independent engine shutdown sequence is composed of a sequence of events that for each phase includes in sequence, a first engine shutdown during the predefined ETOPS flight, a non-restartable second engine shutdown before touchdown at the destination airport or an alternate airport, and the third event of an inability of the first engine to restart.

15. The storage medium of claim 13, wherein the sequence of events for each phase further includes first event of the first engine shutdown during the predefined ETOPS flight, and
wherein the storage medium has further computer program code stored therein that, in response to execution by the processor, causes the system to further calculate the conditional probability of the first event for each phase, the conditional probability of the first event for a phase being calculated as a function of the product of an engine shutdown rate for the respective and a time duration of the respective phase, the engine shutdown rate for at least some of the phases being separate and independent.

16. The storage medium of claim 15, wherein the storage medium has further computer program code stored therein that, in response to execution by the processor, causes the system to further:
receive input including at least the engine shutdown rate for each phase, the engine shutdown rate for a phase being a function of a historical weighting of engine shutdown rates for the respective phase, the historical weighting being specific to a model of the two-engine aircraft.

17. The storage medium of claim 13,
wherein the dual independent engine shutdown sequence is composed of a sequence of events that for each phase further includes a second event of the non-restartable second engine shutdown after the first engine shutdown during the predefined ETOPS flight, and before touchdown at the destination airport or an alternate airport, and
wherein the storage medium has further computer program code stored therein that, in response to execution by the processor, causes the system to further calculate the conditional probability of the second event for each phase, the conditional probability of the second event being calculated as a function of a projected time duration to touchdown at the destination airport or alternate airport, the projected time duration of each phase being separate and independent.

18. The storage medium of claim 13, wherein the storage medium has further computer program code stored therein that, in response to execution by the processor, causes the system to further:
receive input including at least the ratio of a non-restartable engine shutdown rate to total engine shutdown rate for each phase, the ratio of a non-restartable engine shutdown rate to total engine shutdown rate for each phase being established by experience and specific to a model of the two-engine aircraft.

* * * * *